United States Patent
Whiteman

(10) Patent No.: US 11,155,484 B2
(45) Date of Patent: Oct. 26, 2021

(54) SYSTEMS AND METHODS FOR TREATING WASTEWATER AND PROVIDING CLASS A SLUDGE

(71) Applicant: Advanced Biological Services, Inc., Fleming Island, FL (US)

(72) Inventor: Robert Whiteman, Fleming Island, FL (US)

(73) Assignee: Advanced Biological Services, Inc., Fleming Island, FL (US)

( * ) Notice: Subject to any disclaimer, the term of this patent is extended or adjusted under 35 U.S.C. 154(b) by 0 days.

(21) Appl. No.: 16/389,936

(22) Filed: Apr. 20, 2019

(65) Prior Publication Data

US 2020/0087183 A1    Mar. 19, 2020

Related U.S. Application Data

(60) Provisional application No. 62/660,907, filed on Apr. 20, 2018.

(51) Int. Cl.

| C02F 9/00 | (2006.01) |
|---|---|
| C02F 1/00 | (2006.01) |
| C02F 3/00 | (2006.01) |
| C02F 3/12 | (2006.01) |
| C02F 3/34 | (2006.01) |
| C02F 11/121 | (2019.01) |
| C02F 101/20 | (2006.01) |

(52) U.S. Cl.
CPC ............. *C02F 9/00* (2013.01); *C02F 1/004* (2013.01); *C02F 3/006* (2013.01); *C02F 3/1221* (2013.01); *C02F 3/348* (2013.01); *C02F 11/121* (2013.01); *C02F 2001/007* (2013.01); *C02F 2101/20* (2013.01); *C02F 2301/046* (2013.01)

(58) Field of Classification Search
None
See application file for complete search history.

(56) References Cited

U.S. PATENT DOCUMENTS

| 4,073,722 A | 2/1978 | Grutsch |
| 4,113,617 A | 9/1978 | Bereskin |
| 4,374,027 A | 2/1983 | Severeid |
| 4,647,536 A | 3/1987 | Mosbach |
| 4,693,833 A | 9/1987 | Toshikuni |
| 4,940,539 A | 7/1990 | Weber |
| 5,078,888 A | 1/1992 | Penticoff |
| 5,171,687 A | 12/1992 | Moller |

(Continued)

FOREIGN PATENT DOCUMENTS

| WO | WO-9851786 A1 * | 11/1998 | ............... C02F 3/34 |
| WO | WO 2014/131134 | 9/2014 | |

OTHER PUBLICATIONS

Cedar Creek wastewater treatment plant, Metropolitan Sanitary District, Louisville/Jefferson County, KY, https://louisvillemsd.org/programs/pretreatment-and-hazmat-program/cedar-creek-water-quality-treatment-center, printed Sep. 26, 2020 (Year: 2020).*

(Continued)

*Primary Examiner* — Chester T Barry
(74) *Attorney, Agent, or Firm* — Glen P. Belvis; Belvis Law, LLC.

(57) ABSTRACT

A method of providing, maintaining and using a youthful added microbe population for the treatment of wastewater. A method to obtain Class A sludge without the need for disinfecting procedures.

30 Claims, 14 Drawing Sheets

(56) References Cited

U.S. PATENT DOCUMENTS

| | | | |
|---|---|---|---|
| 5,206,168 | A | 4/1993 | Boyle |
| 5,409,615 | A | 4/1995 | Wallman |
| 5,409,834 | A | 4/1995 | Birdwell |
| 5,434,331 | A | 7/1995 | Barkatt |
| 5,506,117 | A | 4/1996 | Andrews |
| 5,678,639 | A | 10/1997 | Golden |
| 5,683,575 | A | 11/1997 | Yates |
| 5,807,485 | A | 9/1998 | Caplan |
| 5,840,182 | A | 11/1998 | Lucido |
| 5,846,425 | A | 12/1998 | Whiteman |
| 5,888,396 | A | 3/1999 | Perriello |
| 5,958,241 | A | 9/1999 | DeBenedetto |
| 5,972,220 | A * | 10/1999 | Bailey ............... C02F 3/1221 210/605 |
| 6,150,157 | A | 11/2000 | Keasling |
| 6,447,683 | B1 * | 9/2002 | Gubb ............... C02F 3/006 210/613 |
| 6,454,944 | B1 * | 9/2002 | Raven ............... C12M 45/20 210/603 |
| 6,908,555 | B2 * | 6/2005 | Arnett ............... C12M 27/20 210/181 |
| 7,879,593 | B2 | 2/2011 | Whiteman |
| 8,835,155 | B2 * | 9/2014 | Dvorak ............... C05F 17/921 435/268 |
| 9,409,803 | B2 | 8/2016 | Whiteman |
| 9,783,438 | B2 | 10/2017 | Whiteman |
| 9,969,633 | B2 | 5/2018 | Whiteman |
| 2003/0186036 | A1 | 10/2003 | Goodell |
| 2008/0210630 | A1 | 9/2008 | Whiteman |
| 2008/0277338 | A1 | 11/2008 | Whiteman |
| 2009/0114602 | A1 | 5/2009 | Logan |
| 2010/0089824 | A1 | 4/2010 | Whiteman |
| 2010/0089826 | A1 | 4/2010 | Whiteman |
| 2013/0085683 | A1 | 4/2013 | Garcia |
| 2016/0108480 | A1 | 4/2016 | Logan |
| 2017/0233786 | A1 * | 8/2017 | Jung ............... C12M 23/10 435/32 |
| 2018/0072596 | A1 * | 3/2018 | Whiteman ............... C02F 3/348 |
| 2019/0169054 | A1 * | 6/2019 | Piascik ............... C02F 3/005 |
| 2020/0087183 | A1 * | 3/2020 | Whiteman ............... C02F 9/00 |

OTHER PUBLICATIONS

Biofermentation—A Plug & Play BiotechnologyTM Process Patented (filed in U.S. Appl. No. 62/660,907 on Apr. 20, 2018) (Year: 2018).*

Sep. 17, 2019, WIPO, PCT Opinion PCT/US2019/028417.

Sep. 17, 2019, WIPO, PCT Search PCT/US2019/028417.

2015, UK Water Indusrty, Biodolids: Good Practice Guidance Leaflet.

* cited by examiner

| Pathogen Reduction Alternatives | Organism to be Monitored | Allowable Level in Sludge |
| --- | --- | --- |
| All Class A Alternatives 1,2,3,4,5,6 | Fecal Coliform | 1,000 Most Probable Number (MPN) per gram (Class A) of total solids (dry weight) |
| All Class A Alternatives 1,2,3,4,5,6 | Salmonella sp. bacteria (in lieu of fecal coliform) | 3 MPN per 4 grams total solids (dry weight) |
| Class A Alternatives 3 and 4 only | Enteric Viruses | Less than one plague-forming unit per 4 grams total solids (dry weight) |
| Class A Alternatives 3 and 4 only | Viable Helminth Ova | Less than one viable helminth ovum per 4 grams of total solids (dry weight) |
| Class B Alternative 1 | Fecal Coliform | Less than $2 \times 10^6$ MPN or less than $2 \times 10^6$ colony-forming units per gram of total solids (dry weight) (expressed as geometric mean of the results of 7 individual samples) |

FIG. 2

| Parameter: | Units: | FL Max-Statistical Limits Basis-Mean | | Sample Date | |
|---|---|---|---|---|---|
| | | Monthly | Single | 10/19/2017 | 2/5/2019 |
| | | | | PRIOR | DURING |
| MOISTURE & SOUNDS CONTENT | | | | | |
| % Moisture | % | N/A | N/A | 98 | 97 |
| % Solid | % | N/A | N/A | 1.90 | 3.0 |
| NUTRIENT CONTENT | | | | | |
| Total Nitrogen | % | Report | Report | 2.3 | 5.0 |
| Total Kjeldahl Nitrogen | % | Report | Report | 23000 | 5.0 |
| Nitrite + Nitrate | mg/Kg | Report | Report | 180 | 400 |
| Ammonia | mg/Kg | Report | Report | NR | 18 |
| Total Phosphorus | % | Report | Report | 2.3 | 2.1 |
| METALS CONTENT | | | | | |
| Arsenic | mg/Kg | 41 | 75 | 2.4 | 4.4 |
| Cadmium | mg/Kg | 39 | 85 | 2.1 | 1.7 |
| Chromium | mg/Kg | N/A | N/A | 22 | 18 |
| Copper | mg/Kg | 1500 | 4500 | 360 | 260 |
| Lead | mg/Kg | 300 | 840 | 51 | 47 |
| Mercury | mg/Kg | 17 | 57 | 2.2 | 1.1 |
| Molybdenum | mg/Kg | N/A | 75 | 14 | 4.8 |
| Nickel | mg/Kg | 420 | 420 | 21 | 5.2 |
| Potassium | % | Report | Report | 0.48 | 2100 |
| Selenium | mg/Kg | 100 | 100 | 2.0 | 7.0 |
| Zinc | mg/Kg | 2800 | 7500 | 1000 | 1500 |
| | N:P Ratio | | | 1.00 | 2.38 |
| | N:P Ratio | | | 0.21 | 1000 |

FIG. 14

SYSTEMS AND METHODS FOR TREATING WASTEWATER AND PROVIDING CLASS A SLUDGE

This application claims under 35 U.S.C. § 119(e)(1) the benefit of U.S. provisional application Ser. No. 62/660,907 filed Apr. 20, 2018, the entire disclosure of which is incorporated herein by reference.

BACKGROUND OF THE INVENTION

Field of the Invention

The present inventions relate to the treatment of wastewater with biological materials, systems and methods for preforming such treatments, and the production from wastewater of useful, safe and environmentally acceptable materials, including liquids.

In general wastewater treatment systems handle effluent from municipalities, industrial sites, factories, storm drainage systems and other locations where water that has been contaminated with undesirable materials is present. As used herein, unless stated otherwise the term "wastewater treatment system" should be given its broadest possible meaning and would include: industrial and municipal systems having primary treatment, secondary treatment or tertiary treatment and combinations and variations of these; aerobic, facultative, or anaerobic biological wastewater systems; aerobic processes include, for example, activated sludge systems, aerobic stabilization basins (ASB), aerated lagoons, single pass lagoon systems, stabilization ponds, rotating biological contactors, and trickling filters; facultative processes include, for example, facultative lagoons; anaerobic processes include, for example, anaerobic ponds, anaerobic digesters, anaerobic filters or contactors, and anaerobic treatment systems; systems having clarifiers, settling tanks, digesters, activated sludge systems, lagoons, single pass lagoons, and combinations and variations of these; systems such as activated sludge systems, rotating disc systems, submerged aerated filter, suspended media filters, sequencing batch reactors non-electric filters and trickling filters; and combinations and variations of these and other device for cleaning wastewater.

Wastewater treatment plants can range from small volumes per day, measures in flow per day, i.e., gallons per day (GPD) to large volumes measured in flows of million (1,000,000) gallons per day (MGD). The flow can be 10s, 100s, 1,000s, 10,000s, and 100,000s of GPD. Typically, for municipal and industrial sites, the flow of wastewater is in the millions of gallons per day ("MGD"), and can range from 1 MGD to 100 MGD, from 5 MGD to 50 MGD, from about 1 MGD to about 15 MGD, from about 5 MGD to about 25 MGD, from about 10 MGD to about 40 MGD, from about 20 MGD to about 50 MGD, from about 25 MGD to about 60 MGD, from about 200 MGD to about 300 MGD, and greater and smaller, flows as well as, all flows within these ranges.

The capacity or size of a wastewater treatment plant can also be measured in Population Equivalent ("PE"). PE is standardization that is used to measure flow, and compare flow between different treatment plants. PE is the number expressing the ratio of the sum of pollution load produced during 24 hours by industry facilities and service to the individual population in household sewage produced by one person in the same time.

$$PE = \frac{BOD \text{ load from industry} \left[\frac{kg}{day}\right]}{0.054 \left[\frac{kg}{inhab \cdot day}\right]}$$

Typically, one unit of PE is equal to 54 grams of BOD per 24 hours. In flow, a unit of PE typically equates to 50 gallons per person per day or 200 liters per person per day. Wastewater treatment plants can have capacities of 10,000 to 200,000 PE, 50,000 to 100,000 PE, 50,000 to 500,000 PE, 100,000 PE to 2,000,000 (2 mm) PE, 1 mm PE to 4 mm PE, and all capacities within this range, and greater and smaller capacities.

In general, absent expensive and sometimes unreliable treatment equipment or processes, such as sludge stabilization equipment, the sludge or waste sludge or biosolids which terms are used as synonymous terms herein unless expressly stated otherwise, that is produced by the wastewater treatment system typically contains undesirable material that requires further costly and environmentally less desirable disposal techniques. These processes require large capital expenditure and have high operating costs along with high carbon footprints, use harsh and dangerous materials, such as caustic and acidic chemicals, as well as other disadvantageous requirements. In particular, the latter prior pH-based systems, as well as other prior disinfections systems, have proven to be unreliable, undesirable and have not met the needs for the production of safe, usable, and economically and environmentally acceptable sludge and other such end of process materials. Other less capital intensive variations, such as composting, nevertheless have disadvantages of using fillers such as bark, which might be contaminated with legislated fecal matter making standards for fecals more difficult to meet.

As used herein, unless specifically stated otherwise, the term "influent" should be given it broadest possible meaning, and refers to wastewater or other liquid—raw (untreated) or partially treated—flowing into a device, system, apparatus, reservoir, basin, treatment process treatment system, treatment device, tank, or treatment plant or treatment facility.

As used herein, unless specifically stated otherwise, the term "sludge" should be given its broadest possible meaning, and would include the material that is removed from wastewater by a wastewater treatment plant. Typically, sludge can have from about 0.2% to about 80% solids, about 1% to about 60% solids, about 0.25% to 0.5% solids, about 2% to about 4% solids, about 50% to about 99% solids, about 5% to about 25% solids, about 5% solids, about 10% solids, about 1% solids, about 10% solids, about 15% solids, greater than about 0.5% solids, greater than about 2% solids, greater than about 5% solids, and combinations and variations of these as well as all values within these ranges.

As used herein, unless specifically stated otherwise, the terms "floc forming microbes", "floc formers", floc forming, and similar such terms should be given their broadest possible meaning, including a generic group of microbes that cause floc formation or flocculate resulting in large clumps or communities of bacteria working together; including: floc forming bacteria (saprophytes:) *Achromobacter, Flavobacterium, Alcaligenes, Arthrobacter, Zooglea, Acinetobacter, Citromonas*; predators: protozoa, rotifers, nematodes Vorticella, Aspicidica, Paramedium; Phosphate accumulating organisms (PAO), algae (lagoons).

As used herein, unless stated otherwise, room temperature is 25° C. And, standard temperature and pressure is 25° C. and 1 atmosphere.

Generally, the term "about" as used herein unless specified otherwise is meant to encompass a variance or range of ±10%, the experimental or instrument error associated with obtaining the stated value, and preferably the larger of these.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

This Background of the Invention section is intended to introduce various aspects of the art, which may be associated with embodiments of the present inventions. Thus, the forgoing discussion in this section provides a framework for better understanding the present inventions, and is not to be viewed as an admission of prior art.

SUMMARY

There has been a long standing and developing need for methods and apparatus to treat wastewater and to do so in a manner that minimizes the production of hazardous and undesirable constituents. The present inventions, among other things, solve these needs by providing the compositions of matter, materials, articles of manufacture, devices and processes taught, disclosed and claimed herein.

There is provided a method of controlling the age of microbial in treating an influent wastewater stream, the method including: in a wastewater treatment system having an influent of wastewater containing pollutants, the wastewater treatment system comprising a first treatment device, a second treatment device and a third treatment device; wherein the wastewater flows from the first treatment device to the second treatment device to the third treatment device; adding a plurality of microbes to the wastewater treatment system at a controlled and predetermined dosing rate; the microbes selected to remove the pollutants from the wastewater; the plurality of microbes containing from about $10^3$ cfu/ml to $10^{40}$ cfu/ml; the microbes never being frozen or freeze dried, and having a D50 age of less than 14 days; wherein the dosing rate maintains the D50 age of the microbes in the wastewater in the wastewater treatment system at less than 20 days old; and, whereby the pollutants in the wastewater are reduced providing an effluent having pollutants as measured by DOD and TSS reduced by at least about 90%.

Further, there is provided these methods, systems and treatments having one or more of the following features: wherein the wastewater treatment plant has a throughput of about 5 MGD to about 40 MGD; wherein the wastewater treatment plant has a throughput of about 20 MGD to about 100 MGD; wherein the wastewater treatment plant has a throughput of greater than 10 MGD; wherein the waste water treatment plant has a throughput of greater than 100 MGD; wherein the microbes are added to the second treatment device; wherein the microbes are added to the third treatment device; wherein the microbes are added to the second and third treatment devices; and whereby the dose rate is cumulative of a dose rate for each treatment device.

Moreover, there is provided these methods, systems and treatments having one or more of the following features: wherein the wastewater treatment plant has a throughput of about 200 MGD to about 300 MGD; comprising a fourth treatment device; wherein the first treatment device comprises screens and a girt chamber, where by large particles, plastic and girt are removed from the wastewater; wherein the second treatment device comprises a basin; wherein the third treatment device comprises a settling tank; wherein a return stream comprising an activated sludge is flowed to the second treatment device; wherein the effluent is flowed from the third treatment device; wherein the fourth treatment device comprises a holding tank; wherein sludge from the third treatment device is flowed to the fourth treatment device; wherein the sludge is thickened.

Additionally, there is provided these methods, systems and treatments having one or more of the following features: wherein the microbes are added to the second treatment device; wherein the microbes are added to the third treatment device; wherein the microbes are added to the second and third treatment devices; whereby the dose rate is cumulative of a dose rate for each treatment device; wherein the sludge has a fecal coliform level of less than 1,000 most probable number (MPN) per gram of total solids (dry weight), and a *salmonella* sp. bacteria of less than 3 MPN per 4 grams total solids (dry weight); wherein a second dose of microbes is added to the fourth treatment device; wherein the second device does not have oxygen added to it.

Still further there is provided a method of producing class A sludge without the need for disinfectant processing, the method including: obtaining sludge from an activated sludge wastewater treatment plant; flowing the sludge into a settling tank; adding microbe to the settling tank, wherein the microbes are selected to degrade pollutants in the sludge; wherein the microbes have not been frozen or freeze dried; whereby the microbes degrade the pollutants in the sludge; holding the sludge in the settling tank for a holding period; wherein the holding period is at least 60 days; removing the sludge from the holding tank after the holding period; wherein the removed sludge is a Class A sludge; whereby during the holding period the sludge is not subjected to a disinfectant process.

Yet still further there is provided a method of controlling the age of microbial in treating an influent wastewater stream, the method comprising: in a wastewater treatment system having an influent of wastewater containing pollutants, the wastewater treatment system comprising a first treatment device, a second treatment device and a third treatment device; wherein the wastewater flows from the first treatment device to the second treatment device to the third treatment device; adding a plurality of microbes to the wastewater treatment system at a controlled and predetermined dosing rate; the microbes selected to remove the pollutants from the wastewater; the plurality of microbes containing from about $10^3$ cfu/ml to $10^{13}$ cfu/ml; the microbes never being frozen or freeze dried, and having a D50 age of less than 2 days; wherein the dosing rate maintains the D50 age of the microbes in the wastewater in the wastewater treatment system at less than 4 days old; and, whereby the pollutants in the wastewater are reduced providing an effluent having pollutants as measured by DOD and TSS reduced by at least about 90%.

Moreover, there is provided a method of controlling the age of microbial in treating an influent wastewater stream, the method including: in a wastewater treatment system having an influent of wastewater containing pollutants, the wastewater treatment system comprising a first treatment device, a second treatment device and a third treatment device; wherein the wastewater flows from the first treatment device to the second treatment device to the third treatment device; adding a plurality of microbes to the wastewater treatment system at a controlled and predetermined dosing rate; the microbes selected to remove the pollutants from the wastewater; the plurality of microbes containing from about $10^3$ cfu/ml to $10^{13}$ cfu/ml; the microbes never being frozen or freeze dried, and having an average age of less than 10 days; wherein the dosing rate maintains the average age of the microbes in the wastewater in the wastewater treatment system at less than 20 days old; and, whereby the pollutants in the wastewater are reduced providing an effluent having pollutants as measured by DOD and TSS reduced by at least about 90%.

Further, there is provided a method of producing a pathogen free sludge directly from waste water, without a disinfectant post processing, the method including: depositing youthful microbes into an activated sludge; maintaining the age of the deposited microbes in the activated sludge below a predetermined age; removing solids from the activated sludge, wherein the removed solids comprise at least a portion of the deposited microbes; adding additional youthful microbes to the removed solids and holding the removed solids for a period of 30 to 160 days, whereby a clean sludge is obtaining having less than 0.1 NPM/ml of *Salmonella*.

Additionally, there is provided these methods, systems and treatments having one or more of the following features: wherein the clean sludge has less than 10 MPN/mL of Fecal Coliforms; wherein the clean sludge has less than 5 MPN/mL of Fecal Coliforms; wherein the clean sludge has less than 2 MPN/mL of Fecal Coliforms; wherein the clean sludge has less than 1.5 MPN/mL of Fecal Coliforms; wherein the clean sludge has less than 1 MPN/mL of Fecal Coliforms; wherein the clean sludge has less than 0.5 MPN/mL of Fecal Coliforms; whereby a clean sludge is obtaining having less than 5 NPM/ml of *Salmonella*; whereby a clean sludge is obtaining having less than 1 NPM/ml of *Salmonella*; whereby a clean sludge is obtaining having less than 0.01 NPM/ml of *Salmonella*; wherein the clean sludge has less than 2 MPN/4 dry grams infectious units of Culturable Cytopathic Enteric Viruses; wherein the clean sludge is heavy metal free; wherein the clean sludge is essentially heavy metal free.

Yet further there is provided these systems and methods for waste water treatment having one or more of the following features: volume reduction of waste produced; mass reduction of waste produced; conditioning the waste for the removal of pathogens from the produced waste; stabilizing the waste for the removal of pathogens from the product waste; conditioning, stabilizing, and both, for the removal of pathogens, such as *Salmonella* and *E. coli*; increased flexibility for the disposal of waste; and, reduced cost in the disposal of waste.

Yet further there is provided these systems and methods for waste water treatment having one or more of the following features: where the microbes are added as part of a liquid the microbe containing liquid can have from about $10^2$ cfu/ml to $10^{13}$ cfu/ml, $10^3$ cfu/ml to $10^8$ cfu/ml, $10^6$ cfu/ml to $10^8$ cfu/ml, $10^7$ cfu/ml to $10^{11}$ cfu/ml, greater than $10^3$ cfu/ml, greater than $10^8$ cfu/ml, greater than $10^9$ cfu/ml, and about $10^5$ cfu/ml to about $10^{13}$ cfu/ml, about $10^6$ cfu/ml to $10^{12}$ about cfu/ml, $10^8$ cfu/ml to $10^{12}$. The microbe containing liquid having from about $10^{-11}$ g/ml of microbes to about $10^{-1}$ g/ml of microbes, about $10^{-8}$ g/ml of microbes to about $10^{-2}$ g/ml of microbes, and about $10^{-4}$ g/ml of microbes to about $10^{-1}$ g/ml of microbes. These calculations are based on 1 gram dry weight microbe being equivalent to $10^{-13}$ cfu/mL for larger microbes these weights can have ranges from 10× greater, to 100× greater to 1000× greater or smaller microbes have ranges of $10^{-1}$ to $10^{-2}$, $10^{-1}$ to $10^{-3}$.

Additionally, there is provided these systems and methods for waste water treatment having one or more of the following features for handling solids produced by waste water treatment processes: volume reduction of waste produced; mass reduction of waste produced; conditioning the waste for the removal of pathogens from the produced waste; stabilizing the waste for the removal of pathogens from the product waste; conditioning, stabilizing, and both, for the removal of pathogens, such as *Salmonella* and *E. coli*; increased flexibility for the disposal of waste; and, reduced cost in the disposal of waste.

Still further, there is provided these systems and methods for waste water treatment having one or more of the following features for handling excess solids produced by waste water treatment processes: volume reduction of waste produced; mass reduction of waste produced; conditioning the waste for the removal of pathogens from the produced waste; stabilizing the waste for the removal of pathogens from the product waste; conditioning, stabilizing, and both, for the removal of pathogens, such as *Salmonella* and *E. coli*; increased flexibility for the disposal of waste; and, reduced cost in the disposal of waste.

BRIEF DESCRIPTION OF THE DRAWINGS

FIG. 2 is chart setting forth embodiments of sludge types that are obtained by embodiments of systems and methods in accordance with the present inventions.

FIG. 14 is a graph of sludge and effluent properties in accordance with the present inventions.

DESCRIPTION OF THE PREFERRED EMBODIMENTS

Figure 1:
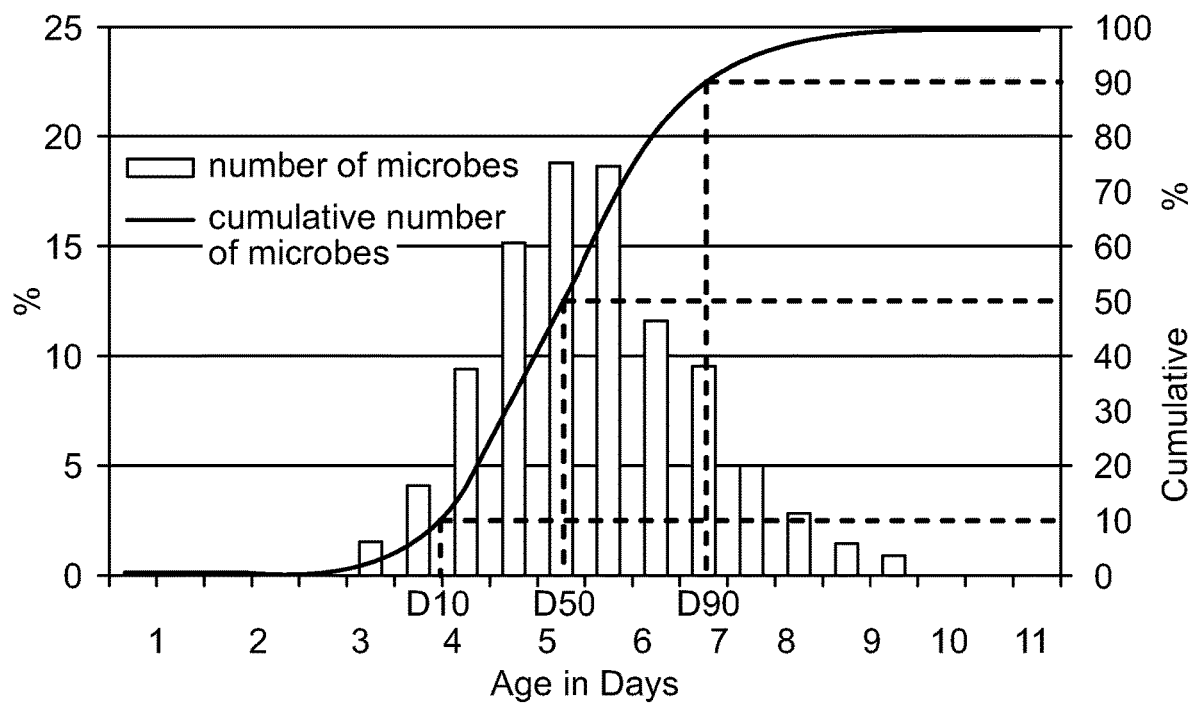
FIG. 1 is a graph illustrating determination of age of microbes used in an embodiment of systems and methods in accordance with the present inventions.

In general, the present inventions relate to systems, apparatus and processes for treating wastewater to reduce the amount of pollutants that is produced by and discharged from wastewater treatment plants. Thus, embodiments of the present inventions relate to the treatment of wastewater with biological materials, systems and methods for preforming such treatments, and the production from wastewater of useful, safe and environmentally acceptable materials, including liquids. Further, embodiments of the present inventions provide sludge with greatly reduced pollutants, including greatly reduced pathogens of environmental concern, thus permitting the sludge to be used in direct application onto fields and for agriculture.

Although this specification primarily focuses on municipal waste water treatment plants, the present inventions are not so limited. Embodiments of the present systems and methods set forth in this specification find use, applicability and provide benefits to industrial waste water treatment plants, such as those in the pulp and paper industries, mining industries, and commercial (factory) farming and livestock facilities.

It has been discovered that the use of microbes for the treatment of wastewater in a wastewater treatment plant is greatly increased by using microbes that are young, and maintaining a youthful population of microbes in the wastewater that is being treated. By young, or youthful, it is meant that the average age of the added microbes in the wastewater treatment system are less than 3 weeks old, less than 2 weeks old, less than 5 days old, less than 2 days old, less than 1 day old, less than 12 hours old, and combinations and variations of these as well as all ages within these ranges. To maintain the population at this age level the microbes should be young when added, and should be added on a regular and period basis to the wastewater being treated in the wastewater treatment plant.

For activated sludge systems the Mean Cell Residence Time ("MCRT") is equal to the mass sludge wasted/mass sludge in system. In embodiments of the present systems and methods the average age of the microbes can be 25% less than the MCRT, can be 35% less than the MCRT, can be less than 50% of the MCRT. In embodiments the D50 age of added microbes is at least 1 day younger than the MCRT, at least 5 days younger than the MCRT, at least 15 days younger than the MCRT. In embodiments the average age, the D50 age, or both, of added microbes is less than MCRT, is at least 1 day younger than the MCRT, at least 5 days younger than the MCRT, at least 15 days younger than the MCRT.

For activated sludge systems Solids Retention Time ("STR"), can find two different meanings. STR can be used synonymously with MCRT and thus has the same meaning. STR are may also be used to refer to the loading of solids on to the aeration basin divided by the mass under aeration, which for clarity will be referred to herein as STR-a. In embodiments of the present systems and methods the average age of the microbes can be 25% less than the STR-a, can be 35% less than the STR-a, can be less than 50% of the STR-a. In embodiments the D50 age of added microbes is at least 1 day younger than the STR-a, at least 5 days younger than the STR-a, at least 15 days younger than the STR-a. In embodiments the average age, the D50 age, or both, of added microbes is less than STR-a, is at least 1 day younger than the STR-a, at least 5 days younger than the STR-a, at least 15 days younger than the STR-a.

For a single pass lagoon the MCRT is equal to the Hydraulic Residence Time ("HRT") because there is no recycle. In embodiments of these systems young microbes are added, periodically, in a predetermined manner, continuously and combinations and variations of these. The age of the microbes (average, or D50) in embodiments is less than the MCRT. In an embodiment, the D50 age of the microbes is less than the MCRT.

While the above refer to the ages of the total number of microbes added to the waste water treatment system, a preferred method to monitor these systems to measure, or focus on, the ages of the floc formers, or floc forming microbes. The above embodiments of ages of microbes in relation to the waste water system (e.g., average age younger than MCRT), would apply, in embodiments, equally to just floc formers (e.g., average age of floc formers is younger than MCRT, etc.).

One advantage when maintaining a young population of floc formers is that natural flocculation allows the separation of the biomass in a clarifier prior to discharge of the clarified effluent. The reliability of this process varies depending on sludge age or mean cell residence time, type of process, wastewater, aeration and a number of other environmental factors. Regardless, the present embodiments by increase the amount of floc formers, and in particular the amount of youthful floc formers, will see these benefits across most if not all waste water systems.

Moreover, keeping the floc formers youthful, and in larger amounts will enable the reduction or mitigation of often undesirable populations such as filamentous bacteria, including Nocardia, Microthrix and unidentified filamentous microbes such as 0041 and 0675 which can cause what is known as bulking or filamentous bulking where the floc will not settle due to bridging between the particles by these filaments or in the case of Zoogloeal bulking just the buoyant nature of this "non-filamentous" bulking agent overwhelming or causing an imbalance in the population and yet in low levels it can live harmlessly without detriment to the processes.

Embodiments of the present inventions have the ability to replace, reduce the number or cost or eliminate the need for membrane separation systems that used membranes with pore sizes smaller than a microbe or less than 0.2 microns, mostly as small as 0.02 microns as a treatment technology to avoid the need for relying on the good flocculation and settlement of the biomass. Many of these systems are expensive to operate and performed poorly.

An embodiment of a method for counting floc formers which involves using a special media which can be obtained from Advanced Biofermentation Services Inc. of Fleming Island. Fla., 32003 USA. This allows tracking of generic floc forming populations in particular gram negatives, which have been shown to be good indicators of the flocculent health of a biomass and hence its ability to settle well. When counts on this media exceed 20,000-100,000 cfu/ml of cfu/g, then floc formation is generally good with Settled Volume Indices (SVI) of less than 60-100 mL/g. Generally, an SVI of 100 mL/g is considered to be a good settling sludge or biomass. When this population is less than 20,000 cfu/mL or cfu/g, then the biomass population is imbalanced and in poor health and generally has poor settling characteristics with filamentous microbes dominating. The addition of liquid microbes in amounts as described in this application maintains a healthy, e.g., youthful, floc former population thereby restoring good biomass health, floc structure, flocculation which results in SVIs of less than 100 mL/g.

In embodiments microbes are added which have gone through a high growth rate doubling every 30-60 minutes so, in fact, they are hours old when added, <1 hour old, or <8 hrs old, thereafter age is dependent on MCRT. In embodiments where microbes exhibit slower growth rates, such as for example, nitrifiers which can only reproduce every 8-10 days, and other microbes that only reproduce every 45-90 minutes, the microbes preferably are added at their youngest age (either D50 or average) and thereafter age is dependent on MCRT.

Thus, for example, if the microbes are being added to a treatment basin, in a continuous single pass lagoon, that has an average mean residence time (MCRT) for the wastewater of X days, and a flow through of Y MGD, the microbes would have to be added a rate sufficient to maintain the average age of the population of microbes in the basin at a youthful level, given that the microbes will be carried out of the basins with the activated sludge recycles, the wastewater and both. In an activated sludge plant biomass is recycled therefore the average MCRT would require calculation based on the mass measured as suspended solids or more commonly as volatile suspended solids in the biological system divided by the mass wasted either deliberately as waste activated sludge (WAS) or non-deliberately in the final effluent as total suspended solids or volatile suspended solids.

In addition to the average age of the microbes, the age of the microbes can be based upon a D50 evaluation. As illustrated in FIG. 1, the D10, D50 and D90 values for the age of the added microbes to wastewater is illustrated. The D50 is that value that represents the age of the microbes that make up 50% of the cumulative population, in a typical age distribution of a population.

Thus, in embodiments of the present inventions the D10 age of the population of microbes added to a particular treatment device, in that device, can be less than 2 weeks, less than 1 week, less than 12 hours, less than 1 hour old, and combinations and variations of these ages, as well as all ages within this range and larger and smaller values.

In other embodiments, while youthful microbes are still being added to the system, the average age of the biomass is maintained at or near the age of the MCRT to have an older biomass. In these embodiments flocculation is favorably controlled by the added microbes, (it is theorized in particular the addition of youthful microbes) which out competes other microbes in the system that create flocculation problems (i.e., the floc structure is lost and becomes filamentous).

Thus, in embodiments the biomass can be as old as possible. For example, in activated sludge typically about y>5 days (although some pure oxygen injection work on 1-2 days) and generally <25-30 days as the population ages floc structure is lost and becomes filamentous. The young microbes that are added to the system, e.g., <48 hours old, <24 hours old, <12 hours old, shifts the average age, D10, D50 age or all of these, of the viable population down to 5 days or less therefore making the process more active, e.g., and by analogy, younger microbes consume more food than older ones.

In an embodiment the younger microbes are added at a peek in their growth curve in the onsite fermentation system. This would be at the point where their growth curve in that system begins to flatten out.

In embodiments pathogens, such as *Salmonella, E. coli, Enterococci*, Helminth ova and Enteric Viruses, are reduced in the wastewater, in the sludge, and in both, by the presence of the youthful microbes.

Thus, in embodiments of the present inventions the D90 age of the population of microbes added to a particular treatment device can be less than 5 weeks, less than 4 weeks, less than 3 weeks old, about 1 week, less than 2 days old, from about 5 weeks to 1 day old, and larger and smaller values and all values within these ranges.

Thus, in embodiment of the present inventions the D50 age, the average age, or both, of the population of microbes added to a particular treatment device can be about 3 weeks, about 2 weeks, about 1 week, about 5 days, about 2 days, about 1 day, about 12 hours, from about 5 weeks to about 12 hours, from about 2 weeks to about days, from about 1 week to about 12 hours, from about 2 days to about 12 hours old, and larger and smaller values and all values within these ranges.

Preferably, the population of added microbes within a particular treatment device in a wastewater treatment system have one or more, of the foregoing D10, D50 and D90 values.

The treatment device or system to which the microbes are added could be an activated sludge system, return activated sludge (RAS) line, anoxic or anaerobic zone, a single pass lagoons, a holding tank, a primary or secondary clarifier, a clarifier, fixed film systems, film based systems, aerobic or anaerobic digesters, anaerobic systems and combinations and variations of these, as well as, other systems that may be developed based upon the teachings of this specification.

In an embodiment the microbes can be added to a collection system, or network, such as a waste water collection system, wet well, transfer station, a collector, or collection basin. In this manner the load of pollutants will be reduced prior to the waste water going to the treatment device or network with multiple application points.

In an embodiment the microbes are added to both the treatment device and the collector, collection network, or network.

In the preferred embodiment of the present inventions the microbes have never been frozen, or freeze dried. In this preferred embodiment of the present inventions the microbes, which have never been frozen, or freeze dried, are in a liquid state. In a preferred embodiment the microbes can be in liquid and added to the treatment device within 48 hours of the peak of their growth curve, for example, just before or when the rate of growth begins to taper off. Generally, for the embodiments and methods of treating waste water, sludge and both, with microbes set out in this specification is preferable that the microbes are not, and have never been frozen, freeze dried, or contain or have been treated with preservatives.

Thus, the microbes are grown into a treatment dose, on site at the wastewater treatment plant, or are grown at a local nearby facility and then transported alive to the site. In embodiments the microbes can be stored and shipped for periods from 48 hours to 7 days, up to 10 days, up to 14 days, all times within this range is contemplated, as well as, quicker and longer times. The microbes in liquid state can be concentrated for transportation, and then, if needed, diluted for application to the site. The microbes can be grown, and the treatment doses can be obtained using the microbes, methods and systems taught and disclosed in U.S. Pat. Nos. 9,409,803 and 7,879,593, the entire disclosure of each of which is incorporated herein by reference. The microbe dose can be added directly to the treatment device, or can be added to a flow line, device, recycle line or other inflow line that is feeding into the treatment device.

In embodiments of the present inventions, the sludge that is produced from the treatment of the wastewater, with the youthful microbial population of the present methods, can be held for a hold period in a holding device, which could be a tank, basin, clarifier, pond, or other device. During the holding period, it is theorized that the population of added microbes, which met the age requirement, for example of being youthful; such as less than 2 weeks old, less than 1 week old, less than 5 days old, less 2 days old, less than 1 day old, of the present invention continue to digest pollutants, including pathogens. Thus, it has been discovered, that by holding the sludge for a period of at least about 30 days, at least about 60 days, at least about 90 days, at least about 120 days, about 30 days, about 60 days, about 90 days, from about 30 to about 120 days, from about 45 days to about 100 days, from about 60 days to about 100 days, from about 60 days to about 150 days, from about 30 days to about 120 days, and larger and smaller values and all values within these ranges, the sludge that is removed from the device is essentially pathogen free. Thus, the sludge is considered a Class A sludge under US EPA regulations (40 C.F.R. § 503 (2017), the entire disclosure of which is incorporated herein by reference. The sludge can be legally and efficaciously directly applied to the surface of fields and crops, which crops can be used for human and animal consumption, without risk or danger to the humans or animals from consumption of the crops so treated or sold directly to the Public. The embodiment of the present process of using youthful microbes provides essentially pathogen free Class A sludge as defined in the Table of FIG. 2. In less preferred embodiments, the sludge produced by the present methods is a Class B, sludge as defined in the Table of FIG. 2.

During these hold times, or the hold period, it is theorized that the added microbes compete for food with pathogens, stopping the pathogens from growing, surviving and thus resulting in their death and reduction in the sludge. The reduction in pathogens can be measured directly, such as by measuring coliforms, or measured by indicator organisms, such as *Enterococci*, which can be used to identify likely pathogen contamination. The pathogens that are reduced or eliminated can be those of FIG. 2, those required to reach class A sludge, any pathogen presently, or in the future, identified by a regulatory body, as being a harmful, detrimental or dangerous organism the levels of which should be monitored, or are otherwise regulated, in the sludge.

The Class A and Class B sludges provided by embodiments of the present inventions can also be, and preferably are, low in heavy metal concentrations, and meet other regulations or standards such as vector attraction which has to prove Specific Oxygen Uptake Rate (SOUR) or VSS reduction.

The embodiment of the present process of using youthful microbes provides essentially Potentially Toxic Elements ("PTE") free sludge for use on land, grass and crops, as set forth in § 6 of Appendix E of the priority document U.S. patent application Ser. No. 62/660,907, the entire disclosure of which is incorporated herein by reference. The essentially PTE Free (by "essentially" free, it is meant that the levels of PTE are below that which is required by a regulatory body for use on land, grass or crops, but that some de minimums amount of PTE may be present). The levels of PTE in § 6 of Appendix E are obtained by embodiments of the present inventions without the need for, and without, some or all of the sludge treatment processes set out in § 4 of Appendix E or other additional treatments or processes, such as additional downstream processing, stabilization with lime, composting, thermophilic digestion, thermal drying, disinfecting processes, procedures or apparatus, such as for example, BCR process using caustic and acidic treatment to formulate hypochlorite as a biocide. The sludge can be legally and efficaciously directly applied to the surface of fields and crops, which crops can be used for human and animal consumption, without risk or danger to the humans or animals from consumption of the crops so treated. The soil so treated will stay within the limits set forth in §§ 7, 7.1, 7.2 and 7.3 of Appendix E.

In an embodiment the sludge treated using the youthful microbial process of the present inventions meets all of the requirements for use for safe use of sludge set forth in Appendix F of the priority document serial number U.S. patent application Ser. No. 62/660,907, the entire disclosure of which is incorporated herein by reference and which forms a part of this specification. Preferably, embodiments of the present systems provide this safe or clean sludge without the need for, and without the use of, an additional treatments or processing, which can be viewed as post processing, such as additional downstream processing, which would include for example, stabilization with lime, composting, thermophilic digestion, thermal drying, disinfecting processes, procedures or apparatus, such as for example, BCR process using caustic and acidic treatment to formulate hypochlorite as a biocide or the processes set out in pasteurization, mesophilic anaerobic digestion, thermophilic aerobic digestion, thermophilic (Cambi) or mechanical (Kady Mill) hydrolytic processes, ozone treatment, and pH based (acid or caustic) treatments. In embodiments the present systems provide this safe or clean sludge with a reduced number, quicker, less expensive and one or more of these, post processing treatment steps. Thus, the system present systems can reduce, minimize and eliminate the need for one or more of these post processing or additional steps.

In treating sludge to obtain essentially PTE free sludge, Class A sludge, or other sludge having safe and efficacious levels of biosolids, the dosing rates of the Microbes can be from about 50 gallons to 500 gallons, about 100 gallons, about 200 gallons, about 300 gallons, from about 50 gallons to about 600 gallons per week, and larger and smaller amounts (depending among other things on the size of system and load on the system), as well as, all values within these ranges. Further, and preferably the microbes, such as, youthful microbes are added to the activated sludge system before the sludge is removed to a holding vessel, such as, a digester, and then the sludge in the digester is treated with preferably youthful microbes using dosing rates of the Microbes can be from about 50 gallons to 500 gallons, about 100 gallons, about 200 gallons, about 300 gallons, from about 50 gallons to about 600 gallons per week, and larger and smaller amounts (depending among other things on the size of system and load on the system), as well as, all values within these ranges. The dosing rates for the activated sludge and digester can be the same or different, they can be added at the same time, or at different times, they can be added periodically or continuously. The rates of addition can change over the course of the process.

Generally, for the various embodiments of methods and treatments disclosed in the Specification, the concentration or amount of microbes in the dosing liquid can vary over a range that is needed to meet the requirements of the system. Thus, for example, the microbe containing liquid can have from about $10^2$ cfu/ml to $10^{13}$ cfu/ml, $10^3$ cfu/ml to $10^8$ cfu/ml, $10^6$ cfu/ml to $10^8$ cfu/ml, $10^7$ cfu/ml to $10^{11}$ cfu/ml, greater than $10^3$ cfu/ml, greater than $10^8$ cfu/ml, greater than $10^9$ cfu/ml, and about $10^5$ cfu/ml to about $10^{13}$ cfu/ml, about $10^6$ cfu/ml to $10^{12}$ about cfu/ml, $10^8$ cfu/ml to $10^{12}$. The microbe containing liquid having from about $10^{-11}$ g/ml of microbes to about $10^{-1}$ g/ml of microbes, about $10^{-8}$ g/ml of microbes to about $10^{-2}$ g/ml of microbes, and about $10^{-4}$ g/ml of microbes to about $10^{-1}$ g/ml of microbes. These calculations are based on 1 gram dry weight microbe being equivalent to $10^{-13}$ cfu/mL for larger microbes these weights can have ranges from 10× greater, to 100× greater to 1000× greater or smaller microbes have ranges of $10^{-1}$ to $10^{-2}$ $10^{-3}$.

In an embodiment the use of microbes, and preferably youthful microbes, to the digester improves settleability of anaerobic sludge, which permits more water to be decanted.

The microbes can be aerobic, facultative or anaerobic in order to improve settleability for decantability and longer holding and dewatering to reduce costs. The holding times can be increased by 5%, 10%, 20%, or more compared to the holding time for the digester before use of the present youthful microbial treatment. A further benefit of the present system is the ability to greatly reduce the capital expenditures by having longer hold times, which may alleviate the need to building additional tanks. Thus, the hold times can be increased for example, from a 30-day hold time (prior to treatment with the present methods) to 90-120 day hold times (with the present methods). In this manner, and in general, hold times can be increased by 2×, 3×, 4× and more.

In an embodiment of the present inventions, youthful microbes, which preferably have not been frozen or freeze dried have are added to the holding device or transfer tank or digester that is holding the sludge. This second doses of youthful microbes can be added to sludge that was produced using the present methods, or sludge that was produced using conventions methods. Class A sludge is provided after a holding time.

Preferably, in an embodiment of the sludge treatment processes, the microbes are in liquid and are added within 48 hours after rate of growth tapers off at the peak of the growth curve.

The following examples are provided to illustrate various embodiments of the present systems and methods of the present inventions. These examples are for illustrative purposes, may be prophetic, and should not be viewed as limiting, and do not otherwise limit the scope of the present inventions.

Example 1

In a wastewater treatment plant having a treatment does of youthful microbes to an activated sludge system, the biosolids or waste activated sludge removed from the activated sludge system having a hold time of 30-90 days in an aerated holding tank, followed by transfer to a tank for a period of 60-90 days which was mixed and aerated once or twice per week for 8-48 hours to encourage nitrification followed by denitrification during the unaerated facultative stage of digestion as nitrates dissipated, the microbes were liquid and were not freeze dried or frozen, and had an average age of less than 60 days while in the activated sludge system. The wasted activated sludge was stirred after about a 90 day hold period and had the properties set out in Table 1.

The sludge to the extent that it contained infectious agents, were in amounts at or below all legal limits, and at or below the detection methods of standard tests, were obtained by natural means without the need for, and without the use of, any additional downstream processing, such as stabilization with lime, composting, thermophilic digestion, thermal drying, disinfecting processes, procedures or apparatus, such as for example, BCR process using caustic and acidic treatment to formulate hypochlorite as a biocide. In the embodiment of this Example, the savings in avoiding further processing of biosolids, operation and maintenance of equipment exceeds $100-200,000+ per year for treating a plant wastewater flow of approximately 0.6-1MGD. In addition, disposal of any biosolids is postponed over 6 months or more. It is theorized that the process can continue up to or beyond 12 months of sustained operation without disposal of any of the Class A biosolids. Biosolids may be maintained for as long as desirable to reduce disposal costs in all applications.

Example 1A

In an embodiment, the treatment process of Example 1, obtains Class B biosolids EPA criteria directly from the aeration basin without further processing due to competition of the treatment batch microbes preventing growth of the pathogens of environmental concern. In many instances, producing Class B, an essentially pathogen free, a clean Class B for pathogen content sludge, and combinations and variations of these, directly from the aeration basin has significant economic benefits by eliminating all downstream processing of biosolids such as aerobic or anaerobic digestion, dewatering processes using chemicals such as polymers. The costs of the latter processes often represent 20-40% of the operational costs of a wastewater treatment system.

Example 1B

The embodiment of Example 1, where the activated sludge system has a MCRT of about 10-30 days; and the hold time in the transfer tank (with once or twice a week mixing and aeration) is about 30-120 days.

Example 1C

The embodiment of Example 1, where the activated sludge system has a MCRT of about 10-20 days; and the

TABLE 1

| Pathogen/Pollutant | Culturable Cytopathic Enteric Viruses | Salmonella | Fecal Coliforms MPN | Helminth Ova in Solids |
|---|---|---|---|---|
| Test | ASTM D4994-89; BCS SOP V-5 | EPA 1682; BCS SOP M-4 | EPA 1681; SM 9221E; BCS SOP H-4 | EPA 625/R-92/013 Ap. 1; BCS SOP H-3 |
| Primary value | ≤1.1 Infectious Units MPN/sample analyzed | ≤0.01 Salmonella MPN/mL sample analyzed | 3.5 Fecal coliforms MPN/mL sample analyzed | ≤1.0 Total Ascaris (Helminth Ova) Count |
| Secondary value | ≤0.5 Infectious Units MPN/4 dry grams (equivalent to cfu/4 grams dry) | ≤1.4 Salmonella MPN/4 dry grams | 217 Fecal coliforms/dry gram | ≤0.4 Ascaris (Helminth Ova)/4 dry grams | hold time in the transfer tank (with once or twice a week mixing and aeration) is about 60-120 days.

Example 1D

The embodiment of Example 1, where the activated sludge system has a MCRT of about 30-45 days; and the hold time in the transfer tank (with once or twice a week mixing and aeration) is about 30-120 days, and preferably less than 90 days.

Example 2

Embodiments of sludge produced by the present methods are essentially free of pathogens, and have the detailed characterizations that are set forth in Appendix C of the priority document serial number U.S. patent application Ser. No. 62/660,907, the entire disclosure of which is incorporated herein by reference. These test data show the reduction in pathogens or infections agents in sludge using the present methods, at various point in the wastewater treatment. This data as shown below in Table 2 below illustrates the dramatic reduction in pathogens from the splitter box to the digester sludge obtained by the present methods and systems.

TABLE 2

| Splitter Box Sludge | Holding Tank | Digester Sludge |
| --- | --- | --- |
| Culturable Cytopathic Enteric Viruses | Culturable Cytopathic Enteric Viruses | Culturable Cytopathic Enteric Viruses |
| 1.1 Infectious Units MPN/sample analyzed | 7.2 Infectious Units MPN/sample analyzed | ≤1.1 Infectious Units MPN/sample analyzed |
| 6.8 Infectious Units MPN/4 dry grams (equivalent to pfu/4 grams dry) | 19.4 Infectious Units MPN/4 dry grams (equivalent to pfu/4 grams dry) | ≤0.5 Infectious Units MPN/4 dry grams (equivalent to pfu/4 grams dry) (Undetectable: Amounts are below detection limit) |
| *Salmonella* | *Salmonella* | *Salmonella* |
| 9.4 *Salmonella* MPN/mL sample analyzed | 10.9 *Salmonella* MPN/mL sample analyzed | ≤0.01 *Salmonella* MPN/mL sample analyzed |
| 5,390 *Salmonella* MPN/4 dry grams | 2,720 *Salmonella* MPN/4 dry grams | ≤1.4 *Salmonella* MPN/4 dry grams (Undetectable: Amounts are below detection limit) |
| Fecal Coliforms MPN | Fecal Coliforms MPN | Fecal Coliforms MPN |
| 17,240 Fecal Coliforms MPN/mL sample analyzed | 160,900 Fecal Coliforms MPN/mL sample analyzed | 1.7 Fecal Coliforms MPN/mL sample analyzed |
| 2,460,000 Fecal coliforms/dry gram | 10,100,000 Fecal coliforms/dry gram | 123 Fecal coliforms/dry gram |

The sludges that had infectious agents that were in amounts at or below all legal limits, and at or below the detection methods of standard tests, were obtained without the need for, and without the use of, any downstream processing, such as stabilization with lime, composting, thermophilic digestion, thermal pasteurization or mechanical hydrolysis, thermal drying, disinfecting processes, procedures or apparatus, such as for example, BCR process using caustic and acidic treatment to formulate hypochlorite as a biocide.

Example 3

An embodiment of the present systems and methods is set forth in Appendix D of the priority document serial number U.S. patent application Ser. No. 62/660,907, the entire disclosure of which is incorporated herein by reference.

There is an increase in return activated sludge (RAS) concentrations, resulting in less volume to be returned, wasted or both. And, allows for the ability to increase Mixed Liquor Suspended Solids ("MLSS"). Further, Results in reduction in secondary wastage (If there are no primary clarifiers then the relationship changes as F:M (food:mass, also M/F and basically means organic loading entering the system with respect to the biomass) becomes less or MCRT is increased, then more biosolids per lb BOD removed are generated). Floc formers out-compete filamentous bacteria. Bacteria adhere to surface of floc improving viability and hence treatment. Increased number of viable bacteria improve treatment capacity/effluent quality Table 3 sets out the general operation conditions and results prior to any microbial treatment, in initial evaluation period of 3-months (microbe treatment), a 7-month interim treatment period (no treatment but residual microbes) and a 3-month evaluation period (microbe treatment).

TABLE 3

| Period 1 Prior period - base line | Period 2 1$^{st}$ evaluation period | Period 3 Interim period | Period 4 2$^{nd}$ evaluation period |
| --- | --- | --- | --- |
| Influent/Input | | | |

TABLE 3-continued

| | Period 1 Prior period - base line | Period 2 1$^{st}$ evaluation period | Period 3 Interim period | Period 4 2$^{nd}$ evaluation period |
| --- | --- | --- | --- | --- |
| Flow (MGD) | 4.6 | 5.4 | 4.6 | 4.0 |
| Inf. BOD (mg/L) | 135 | 87 | 171 | 230 |
| Inf. BOD Load (lbs/d) | 4265 | 4086 | 5885 | 6550 |
| Inf. TSS Load (lbs/d) | 7242 | 6545 | 12134 | 15516 |
| Effluent/output | | | | |
| Effluent BOD (mg/L) | 2.6 | 2.1 | 2.7 | 2.6 |
| Effluent BOD (lbs/d) | 89.5 | 109.0 | 115.8 | 80.7 |
| Effluent TSS (mg/L | 3.1 | 4.6 | 3.5 | 4.0 |

TABLE 3-continued

| | Period 1 Prior period - base line | Period 2 1st evaluation period | Period 3 Interim period | Period 4 2nd evaluation period |
|---|---|---|---|---|
| Effluent TSS (lbs/d) | 111.5 | 233.7 | 145.4 | 173.6 |
| BOD Removed (lbs/d) | 4176 | 3977 | 5758 | 6500 |
| SVI (mL/g) | 121.2 | 128.3 | 135.2 | 105.1 |
| Biosolids (lbVSS/lbBOD) | 0.92 | 0.93 | 0.70 | 0.46 |

Period 4 shows a strong indication in the reduction of biosolids production, while increasing treatment capacity, settleability and effluent quality when compared to Period 1 or Period 3 (In Period 3 the biomass still contained significant amounts of treatment microbes.

Figure 6:
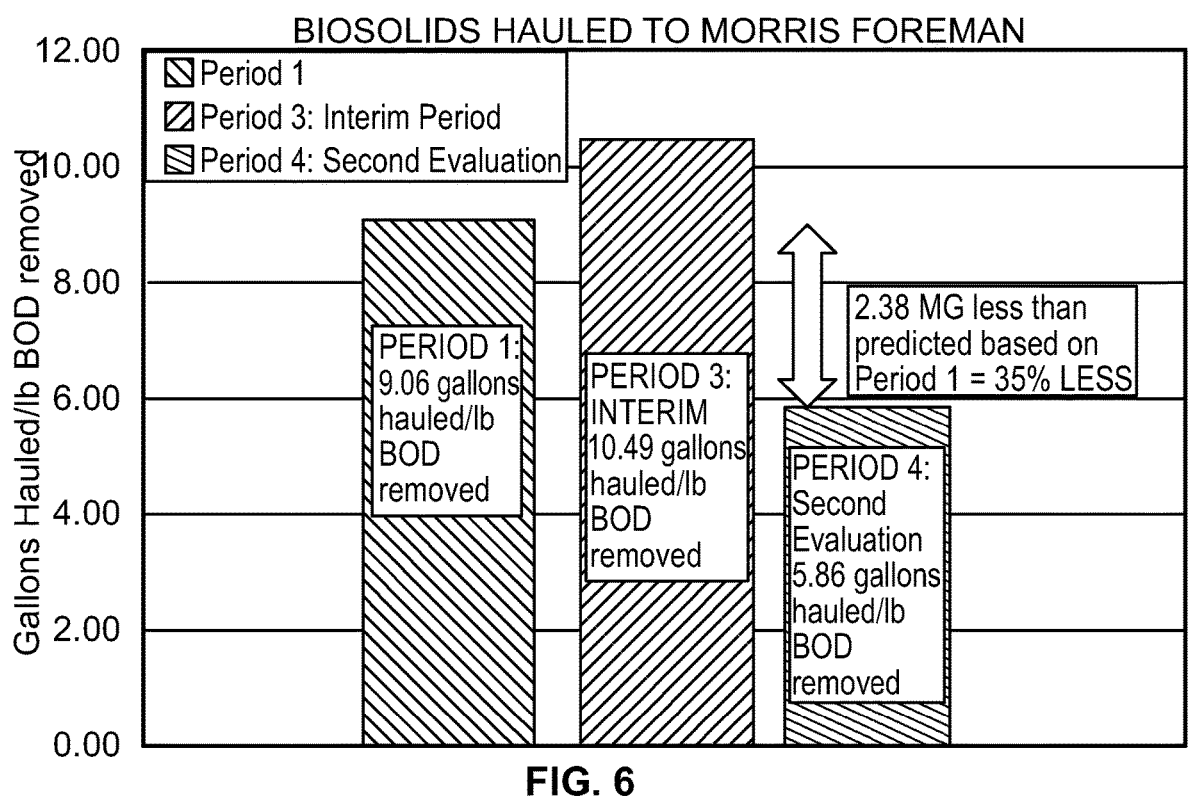
FIG. 6 is a graph depicting solids production by a treatment plant in accordance with the present inventions.

FIG. 6 depicts the gallons hauled per lb of BOD removed in order to normalize the data. The data shows a 35% reduction in gallons hauled per lb of BOD removed for Period 4 (Second Evaluation) versus Period 1 and 44% reduction in comparison to Period 3 "The Interim". This represents 2.38-2.75 MG less hauled which at an average of 6000 gallons per tanker represents a reduction of 396-458 less tankers over 82 days (4.8 tankers per day less). At a nominal cost of $200/tanker this represents a savings in hauling costs of $965+/d or $352,000+ per year.

Figure 7:
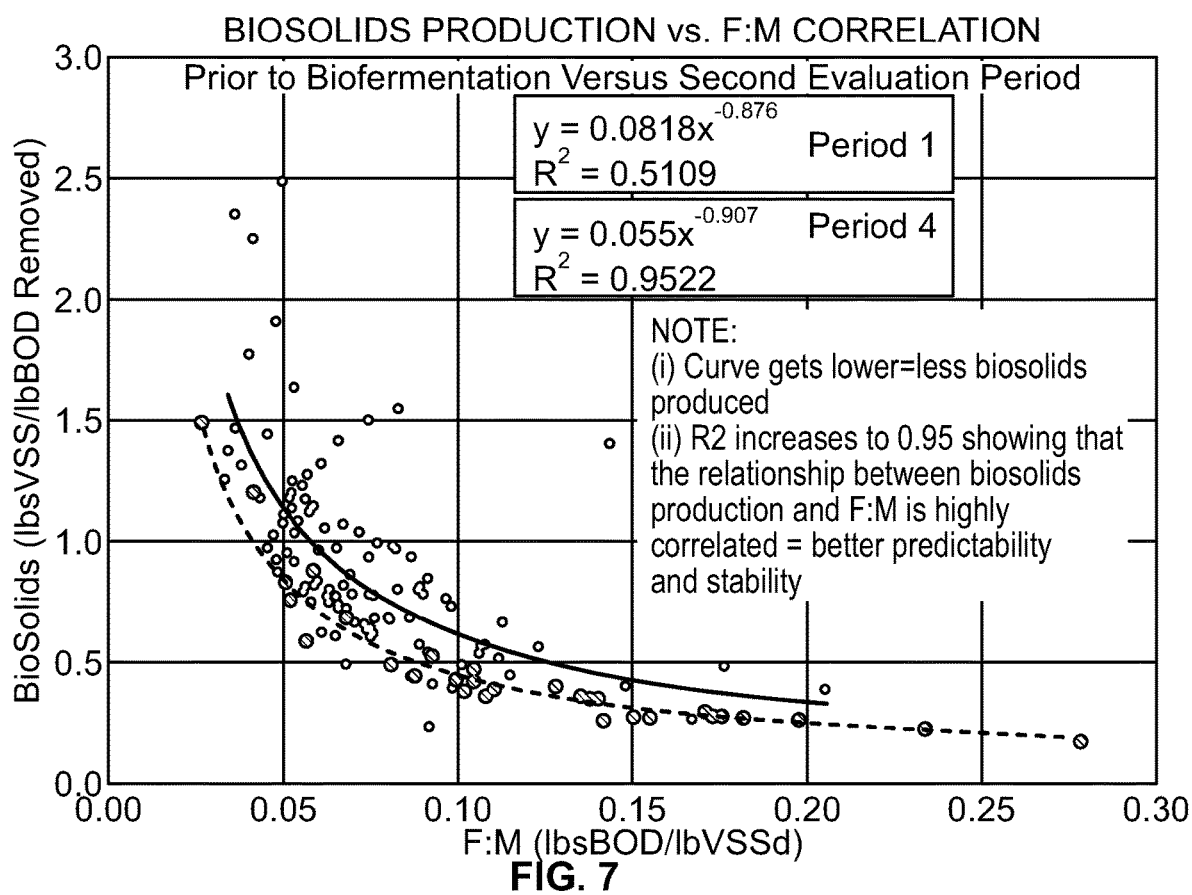
FIG. 7 depicts the biosolids production as correlated to F:M. in accordance with the present inventions

FIG. 7 depicts the biosolids production as correlated to F:M.

Figure 8:
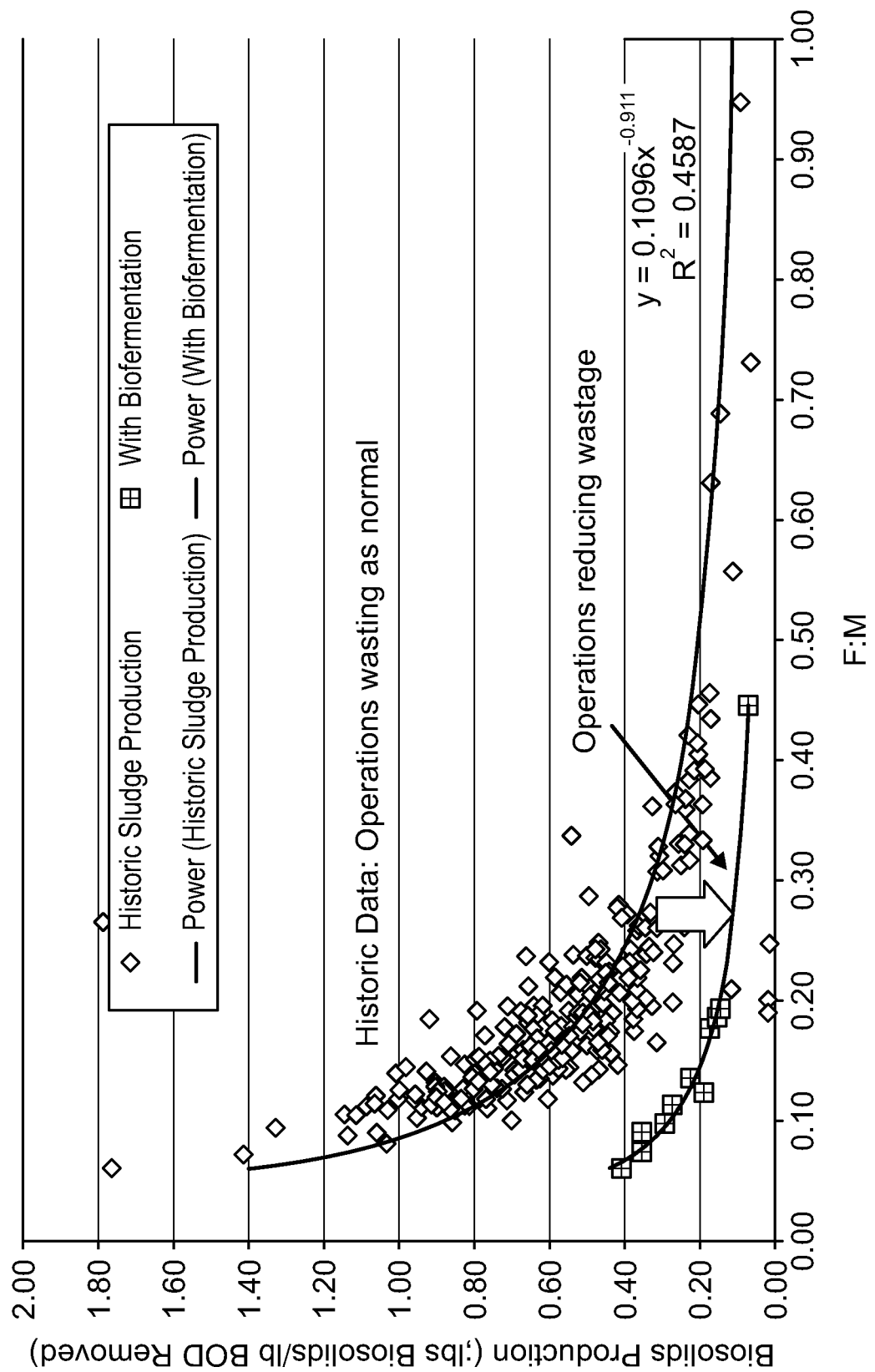
FIG. 8 depicts the daily sludge production in accordance with the present inventions.

FIG. 8 depicts the daily sludge production.

Figure 9:
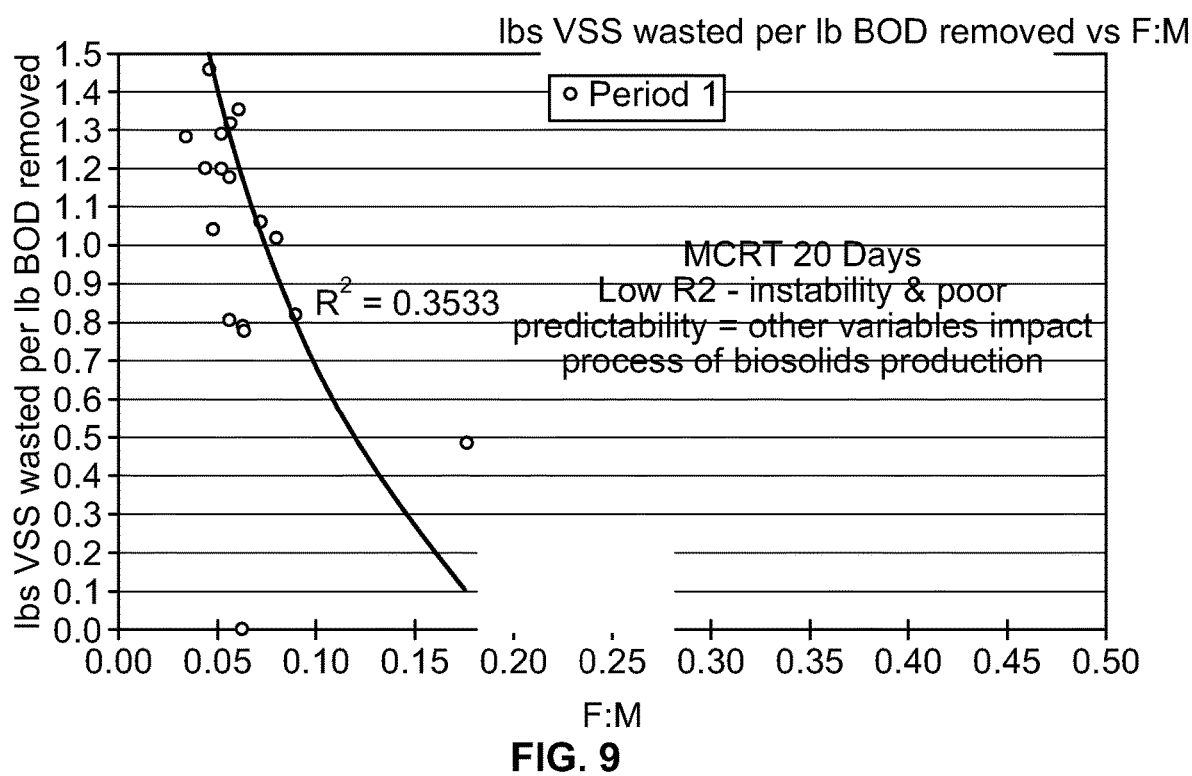
FIG. 9 depicts lbs VSS wasted per lb BOD removed vs F:M in accordance with the present inventions.
Figure 10:
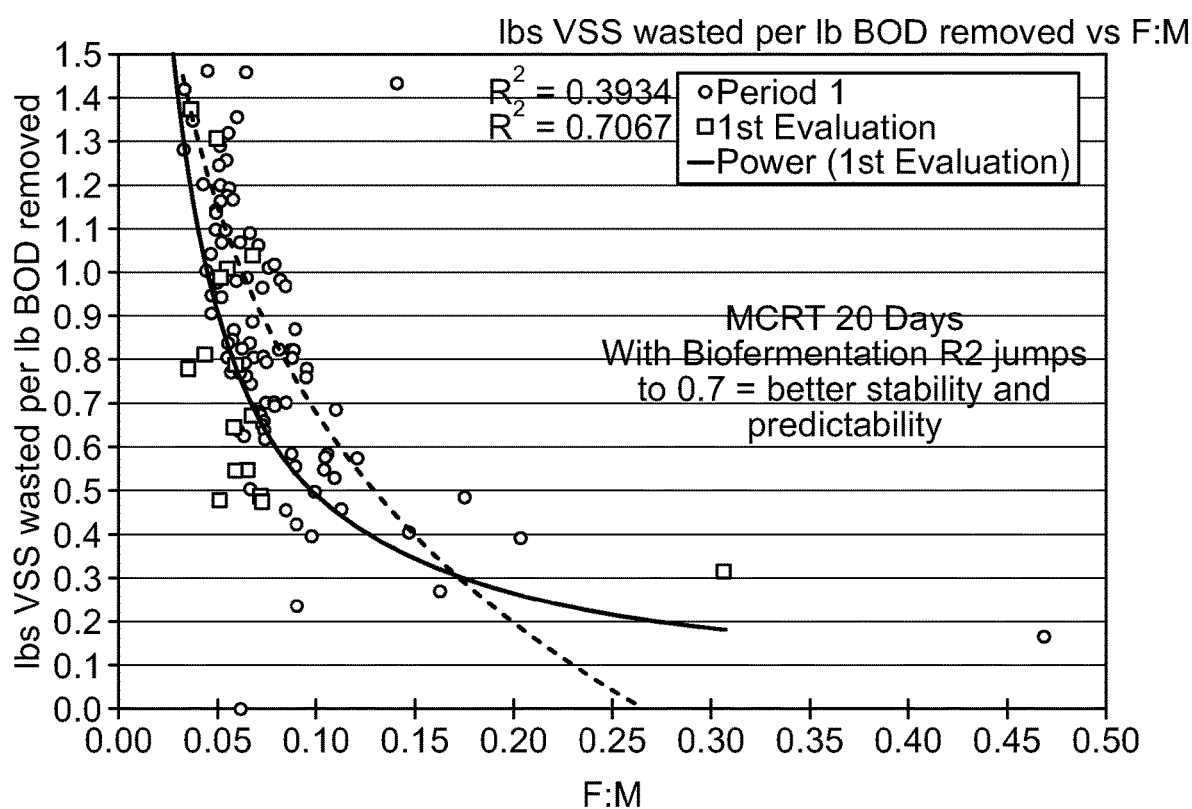

FIG. 9 depicts lbs VSS wasted per lb BOD removed vs F:M for Period 1.

Figure 11:
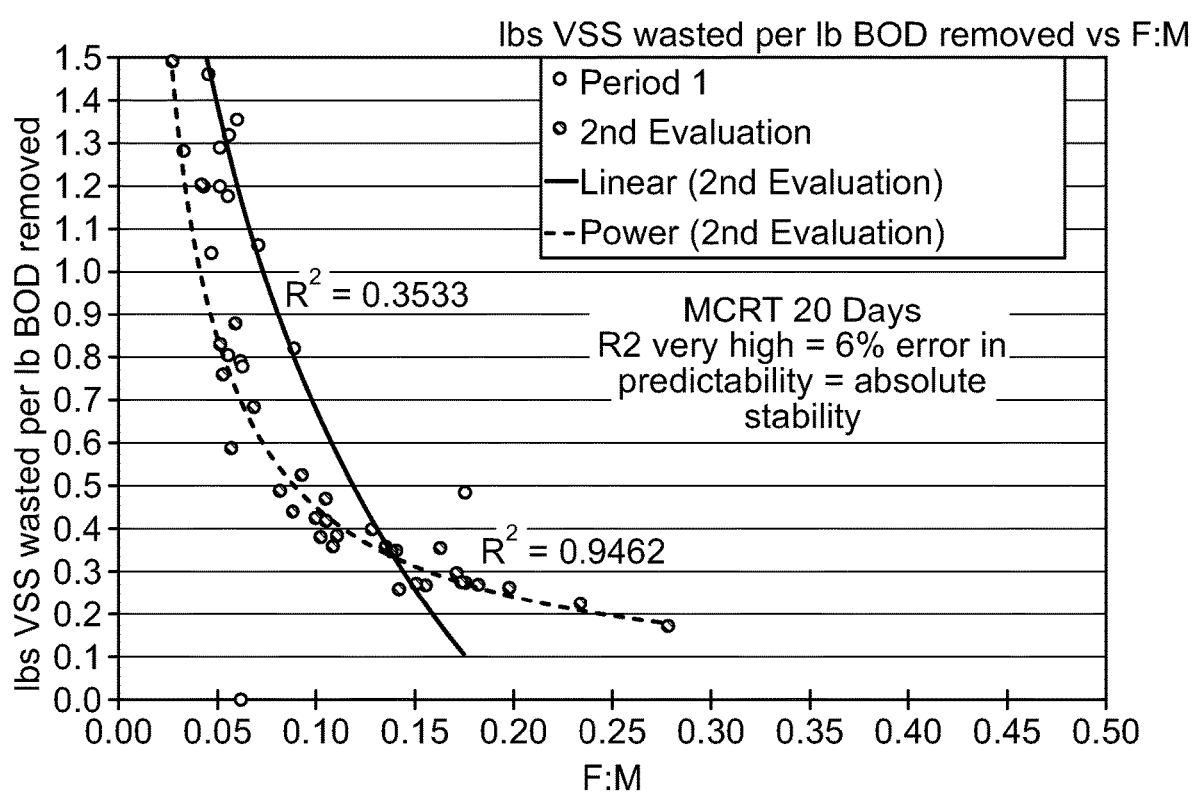
FIG. 11 depicts lbs VSS wasted per lb BOD removed vs F:M in accordance with the present inventions.

FIG. 11 depicts lbs VSS wasted per lb BOD removed vs F:M comparing Period 1 to Period 4.

Figure 12:
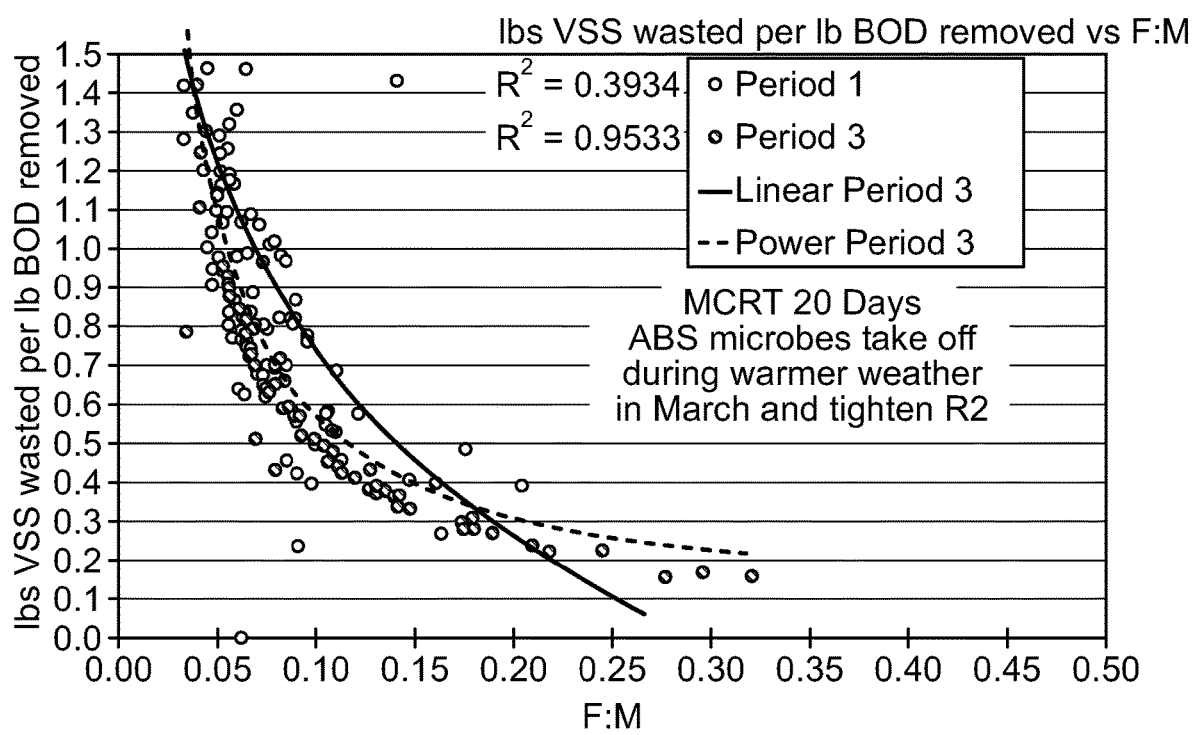
FIG. 12 depicts lbs VSS wasted per lb BOD removed vs F:M in accordance with the present inventions.

FIG. 12 depicts lbs VSS wasted per lb BOD removed vs F:M comparing Period 1 to Period 3.

Figure 13:
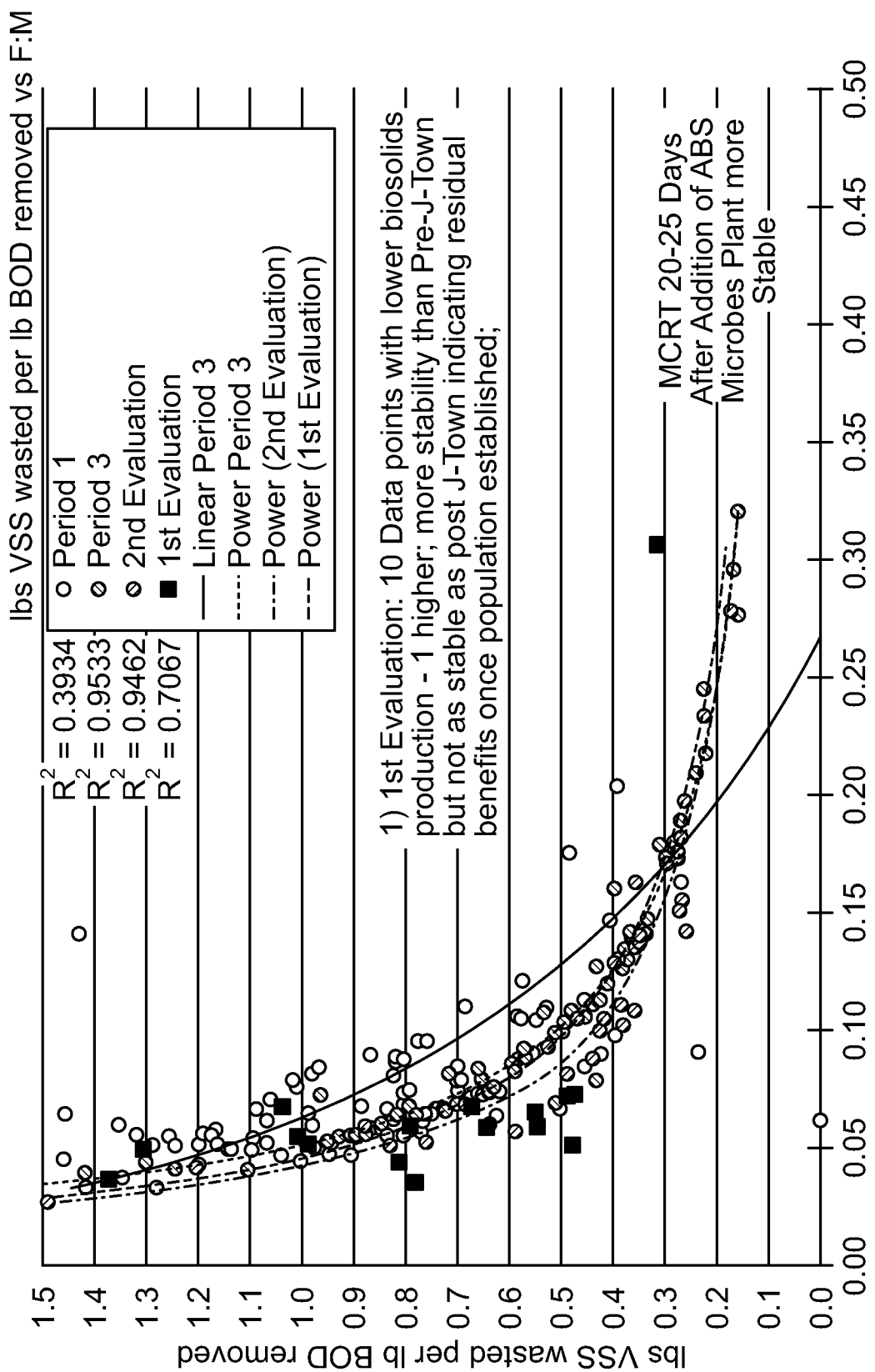
FIG. 13 depicts lbs VSS wasted per lb BOD removed vs F:M in accordance with the present inventions.

FIG. 13 depicts lbs VSS wasted per lb BOD removed vs F:M comparing all four Periods.

Period 4 comparisons made to either Period 1 or to Period 3, when the residual treat microbes were already present and a dominant part of the microbiology, the data conclusively shows that in Period 4 there is a: reduction in biosolids production of 35-50%; improved treatment capacity; Increased settleability of 14-33%. One of many benefits is a significant reduction in the cost of haulage of sludge by $500,000 or more per year.

Example 4

Figure 3:
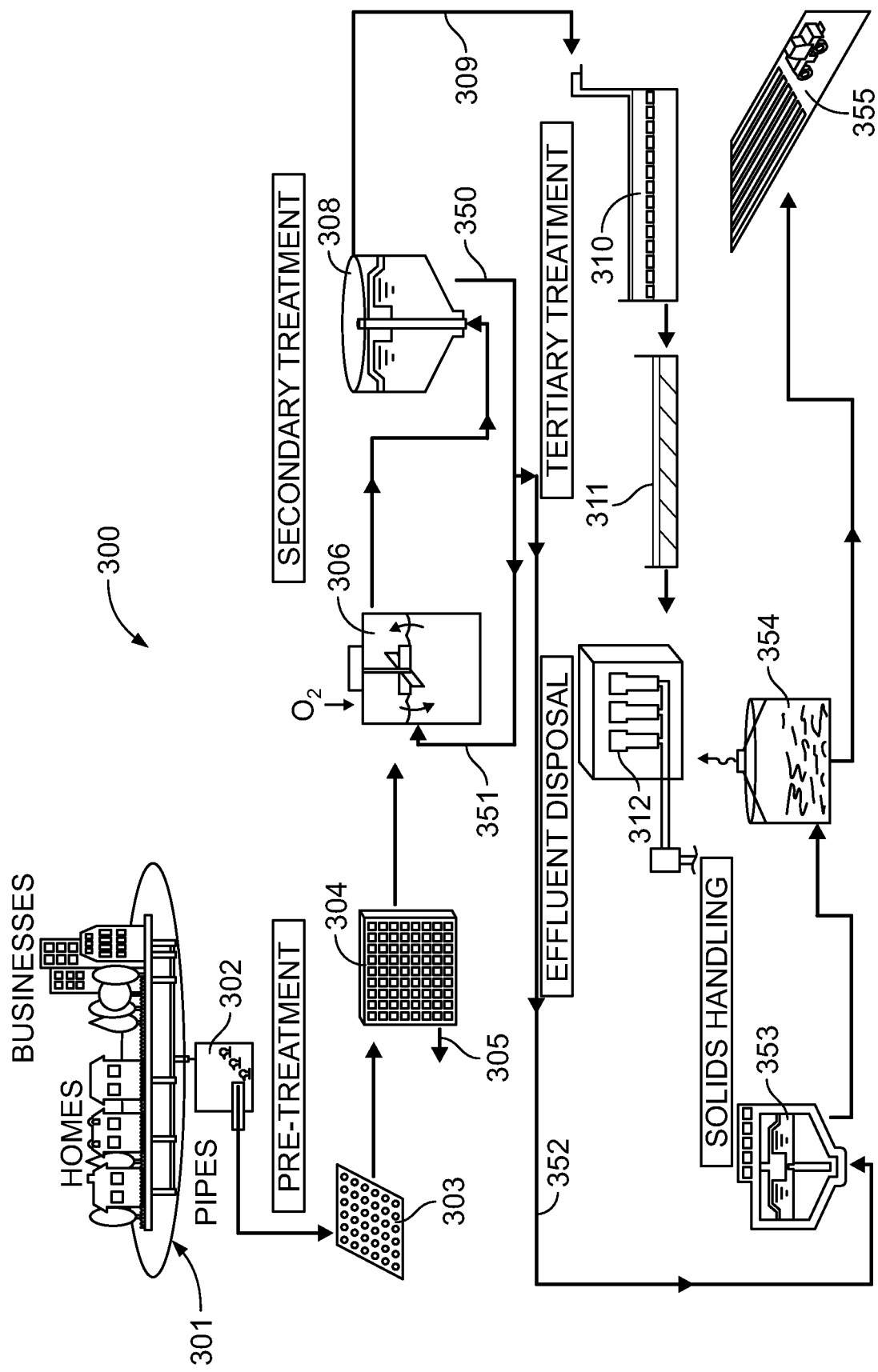
FIG. 3 is a schematic of a waste water treatment plant in which embodiments of systems and methods are implemented in accordance with the present inventions.

Turning to FIG. 3 there is shown a schematic of a wastewater treatment plant 300. The treatment plant 300 receives waste water from sources 301 (homes, business, run off) and is pumped by pump station 302 to influent screens 303. In fluent screens 303 remove large solids such as plastics, wood and cloth. The waste water then flows to an aerated grit chamber 304, where smaller particles such as sand and grit are removed (as shown by arrow 305). The waste water then flows to a oxygenation basin, such as Unox system, 306, where Oxygen is added to the waste water and there is mixing or agitation of the waste water. From the Unox system 306 the waste water flows into a settling tank 308. In the settling tank the bacteria the activate sludge settles to the bottom of the tank. Part of the activate sludge is returned to the Unox system 306, by line 351. The remaining activate sludge is transferred to the sludge processing steps by line 352. The treated waste water, now treatment water, is transferred by line 309 to tertiary treatment systems, such as a sand filter 310 and a chlorine contact basin 311, after which is it disposed of, such as pumping underground 312.

The sludge processing stage includes a sludge thickening in tank 353, and sludge digestion, in digestor 354 (bio gas, methane is vented from the digestor). Dewatered sludge is removed from the digestor 354 and disposed of by for example spreading on a filed 355.

The liquid microbes are grown on-site, and may be in any form, but preferably are not freeze dried or frozen in any manner at any time prior to application. These microbes are added at the incoming flow to the Unox basin 306 so as to distribute the dosage across the entire system or injected into the return activated sludge (RAS) recycle line 351 depending on ease of access, or both. Additionally, further batches could be added to the digester 354 to enhance settleability or improve decantability and further digestion and conditioning or stabilization of the biomass to out-compete pathogens, such as *E. coli* and *Salmonella* which would grow under such conditions.

The Unox system 306 is dosed, with microbes at a concentration of from about $10^6$ cfu/mL to about $10^{11}$ cfu/mL, at a rate of from about 5,000 gals per day (gpd) to about 175,000 gpd, from about 10,000 gpd to about 50,000 gpd, about 20,000 gpd to about 75,000 gpd, about 5,000 gpd to about 100,000 gpd, less than about 10,000 gpd, less than about 20,000 gpd, less than about 50,000 gpd, less than about 100,000 gpd, as well as larger and smaller rates, and all rates within these ranges. Preferably the additions are made daily, but batches can be added less frequently than daily, such as once every two days, once every 3 days or once per week or once per month. The anaerobic system 354 would be dosed based on the ability to decant water off the solids in order to hold the biosolids longer and/or if there was a fall in methane production indicating a slowing down in microbial activity and digestion of the solids. One goal of increasing volatile suspended solids destruction or biosolids destruction would be to enhance methane production for energy recovery and cost reduction. The anaerobic digester 354 would be dosed with similar quantities to the Unox system 306, but once, twice or three times within one day or week or month. One goal of dosing these batches would be to out-compete the growth of pathogenic bacteria in both the activated sludge system and the anaerobic digester thereby causing die off and hence the ability to make the equivalent of a Class B or Clean Class B or Class A sludge, and preferrably to obtain Class A or Class B or Clean Class B sludge; from the activated sludge system or to hold the Class B or Clean Class B sludge long enough in the digesters or ancillary tanks to achieve Class A for disposal. The holding time required between the activated sludge system and the anaerobic digesters would be less than 30 days, less than 60 days, less than 90 days, less than 120 days or less than 150 days. Biosolids can be held longer where there is a benefit to reduce further downstream processing.

The youthful microbes can be added to at least one of the Unox system 306 and to the digester 354, and preferable to both. It however is recognized the youthful microbes can be added to other points in addition to, and well as in alternative to, those locations, which points would include the sludge thickening in tank 353, line 351, line 352, tank 353, and the influent at device 304 or 303.

Example 5

Figure 4:
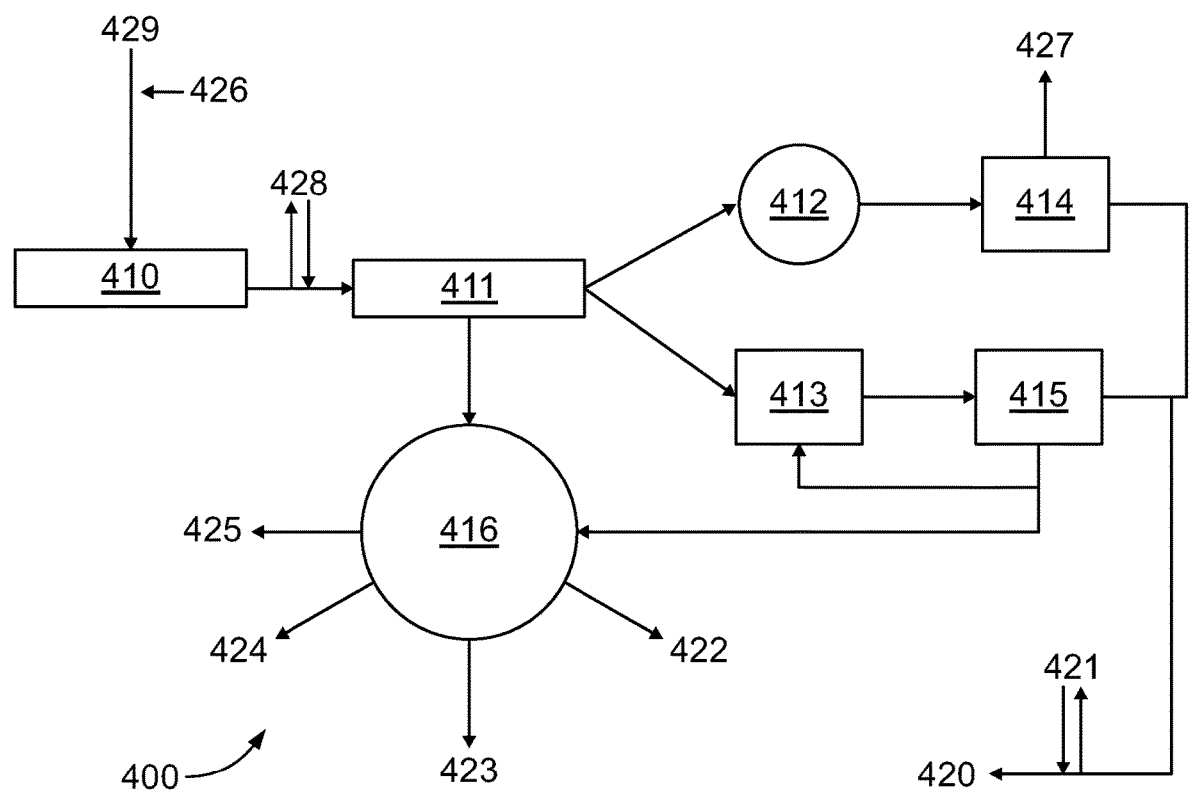
FIG. 4 is a schematic of a waste water treatment plant in which embodiments of systems and methods are implemented in accordance with the present inventions.

Turning to FIG. 4 there is shown a schematic of a wastewater treatment plant 400. The plant 400 has domestic sewage 429, trade waste (industrial) pre-treated 426 flowing into a screening grit channel device 410. The system also as a storm overflow path 428. The waste water flows from the screens 410 into a primary sedimentation unit 411. From the sedimentation unit 411 the waste water flows to either a trickle filter 412 or an activated sludge system 413. The water from the trickle filter 412 flows to a Humus tank 414, where sludge is removed and sent to a secondary sludge treatment 427 and the water is sent to the settlement tank 415. The water from the activated sludge system 411 is also sent to settlement tanks 415. Sludge is removed from the settlement tank 415 and returned to the activated sludge system 413 or sent to the anaerobic digester 416. From the products from anaerobic digestion in the anaerobic digester 416 are methane 422, sludge for disposal on land 425, sludge that is dried and land filled 424, and sludge that is composted 423. Lines 421 are for tertiary or polishing treatments of the effluent, and line 420 is the effluent discharge.

Treatment of this process involves adding treatment batches: to the primary clarifier effluent 411; directly to the activated sludge plant 413; to the return activated sludge line (line connecting 415 to 413); and, combinations and variations of these, depending on, among other things, access and trickling filter. Further batches can be added to the anaerobic digester to ensure decantability of the sludge and further digestion in order to extend the hold time long enough to obtain a Class B or Class A sludge, which could be less than 30 days, less than 60 days, less than 90 days or less than 120 days or the material may be maintained for as long as desirable to reduce disposal costs. For subsequent material taken for composting which in embodiments usually involves mixing with wood used as a filler but waste is highly laden with pathogens of environmental concern; further batches in accordance with the present methods can be added at a rate of less than 1000 gallons per 10 US tons of dry material to remove these pathogens.

The youthful microbes can be added to at least one of the clarifier 411, the activated sludge system 413 and the digester 416, and combinations of one or more or all of these points of addition. It however is recognized that the youthful microbes can be added to other points in addition to, and well as in alternative to, those locations, which points would include the settlement tanks 415, the screens 410, the lines between units 411 and 413, 415 and 413, 415 and 416, 411 and 416, 413 and 415.

Example 6

Figure 5:
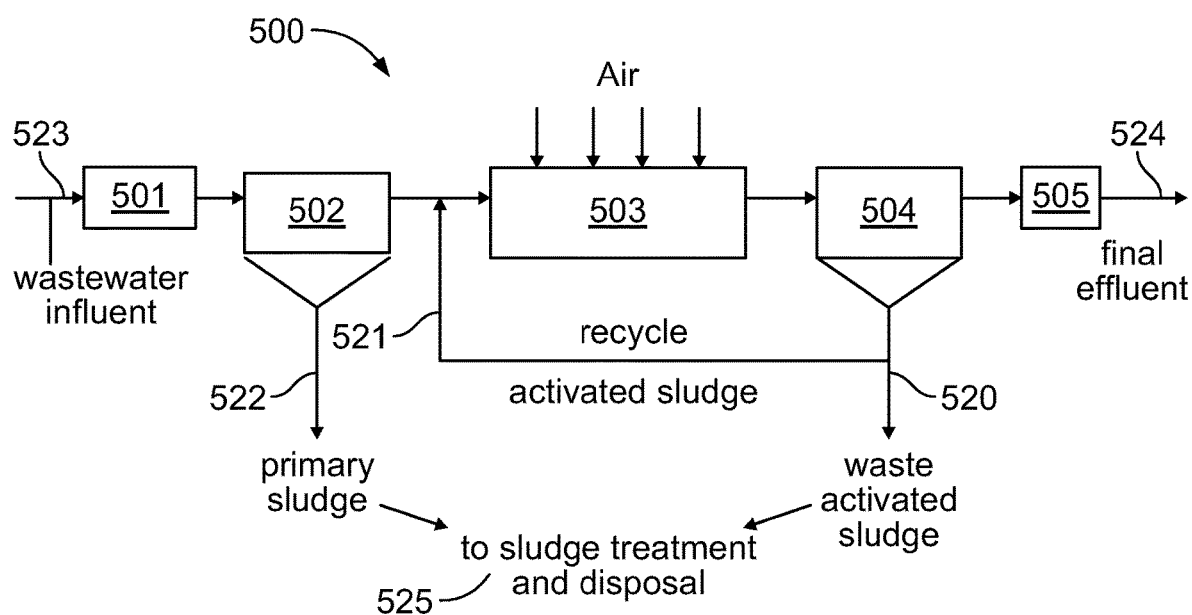
FIG. 5 is a schematic of a waste water treatment plant in which embodiments of systems and methods are implemented in accordance with the present inventions.

Turning to FIG. 5 there is shown a schematic of a wastewater treatment plant 500.

The plant 500 has waste water influent 523 that enters a preliminary treatment unit 501, then flows to a primary clarifier 502. Sludge from the primary clarifier 502 leaves the clarifier by line 522 and goes to sludge treatment and disposal 525. The waste water leaving the clarifier 502 enters the aeration tank 503, where air is added. The waste leaves the aeration tank 503 and enters a secondary clarifier 504. The treated water leaves the secondary clarifier 504 and goes through a disinfection unit 505 and is discharged as effluent 524. The activated sludge from the secondary clarifier is returned via line 521 to the aeration tank 503, or is sent via line 520 to sludge treatment and disposal 525.

In the system the treatment batch, preferably the youthful microbes, is added to the primary clarifier 502 effluent, directly to the activated sludge plant 503 or return activated sludge line 521 depending on ease of access. The goal would be to obtain sufficient treatment in the activated sludge system 503 to attain a Class B sludge prior to wasting. This would require pushing the average MCRT to greater than 20 days, greater than 25 days or greater than 30 days without losing settleability by adding youthful microbes which bring down the average viable age not the average age of the mass. Downstream digestion processes would also be treated whether aerobic, anaerobic, mesophilic or thermophilic processes in order to ensure decantability of the sludge/biosolids and continued digestion.

The youthful microbes can be added to at least one of the primary clarifier 502, the secondary clarifier 504, and the aeration tank (activated sludge plant) 503, and combinations of one or more or all of these points of addition. It however is recognized that the youthful microbes can be added to other points in addition to, and well as in alternative to, those locations.

Example 7

Reduction in coliforms by the microbial competition of the present processes to provide—Class A<1,000 cfu/g, or Class B<1,000,000 cfu/g sludges or Clean Class B<100,000 cfu/g.

Example 7A

In an embodiment of the present microbial treatment, preferably with youthful microbes, Class B sludge is obtained in the aeration basin.

Example 7B

In an embodiment of the present microbial treatment, preferably with youthful microbes, sludge having less about 2,500 cfu/g is obtained by holding sludge in a digester cycled to create facultative, aerobic or anaerobic conditions, from a starting sludge with >10,000,000 cfu/mL. This level of purity is obtained without, and without the need for, downstream processing equipment for handling biosolids, which downstream steps and equipment can now be replaced or the number or cost reduced or eliminated.

Example 7C

In an embodiment of the present microbial treatment, preferably with youthful microbes, Class A sludge in digester cycled aerobic or anaerobic to create facultative conditions is obtained from a starting sludge with >10,000,000 cfu/mL. This level of purity is obtained without, and without the need for, downstream processing equipment for handling biosolids, which downstream steps and equipment can now be eliminated.

Example 7D

In an embodiment of the present microbial treatment, preferably with youthful microbes, sludge having less about 1,000 cfu/g is obtained by holding sludge in a digester cycled to create facultative, aerobic or anaerobic conditions, from a starting sludge with >10,000,000 cfu/mL. This level of purity is obtained without, and without the need for, downstream processing equipment for handling biosolids, which downstream steps and equipment can now be eliminated.

Example 8

Nitrogen removal: Simultaneous Nitrification and Denitrification of wastewater in a wastewater treatment system.

Using the present processes, nitrification/denitrification in an aerated tank/vessel where SRT/MCRT is too low to maintain conventional nitrification. In this manner the SND population is increased.

Example 9A

Type 1—Conventional Activated Sludge: Removal of nitrogen conventionally is achieved by either installation of anoxic zone at the front of an activated sludge plant or by cycling air on/off in the plant using enabling bacterial species such as *Nitrosomonas* to convert ammonia to Nitrite and *Nitrobacter* to convert Nitrite to Nitrate under aerobic conditions followed by denitrification by conversion of nitrate to nitrogen gas by heterotrophic bacteria such as *Pseudomonas* species under anaerobic conditions in an anoxic zone with a requirement for presence of easily biodegradable carbon compounds such as volatile fatty acids (VFAs).

Example 9B

Type 2—Unconventional Processes—New Processes have been developed causing Granule Sludge Particles which contains a Microbial Consortium capable of simultaneous stabilization of BOD, conversion of ammonia to nitrite and then straight to nitrogen gas as the denitrification step and phosphate stabilization in a one-step simultaneous process. The advantages are smaller footprint, good settleability and 25% less energy for nitrification as the conversion of nitrite to nitrate does not occur. It is also reported that these processes produce 25% less sludge/biosolids.

By isolation of microbes such as Thiosphera pantotropha (TP) that can perform transformation of ammonia to nitrite and then directly to nitrogen gas under aerobic conditions an advantage can be created by introducing this bacterium or others with such capability into continuous flow through or batch treatment activated sludge processes with greater reliability under aerobic conditions; as TP can perform this transformation under relatively high dissolved oxygen concentrations. Another advantage is that these microbes grow faster than *Nitrosomonas* and *Nitrobacter*, which makes growing a treatment batch within 24 hours using Biofermentation advantageous, whereas conventional nitrification processes using *Nitrosomonas* and *Nitrobacter* require almost 10 days to grow. Another bacteria that could be used is called Commonox and as microbiological identification of these microbial consortiums becomes more sophisticated more bacteria will be isolated that could be used. Therefore, based upon the present teachings other microbes will be discovered or isolated, which will provide functional bacteria responsible for biological nutrient removal and which can be used in the present systems and methods.

Example 9C

Type 3: Unconventional with novel microbes such as Commonox can be sued to make transformations within existing activated sludge or fixed film systems without the need for new engineering construction or processes to encourage growth of such bacteria. Commonox could be grown externally and introduced via the treatment batch to achieve desired results based on its biochemistry. Therefore, based upon the present teachings other microbes will be discovered or isolated, which will provide functional bacteria responsible for biological nutrient removal and which can be used in the present systems and methods.

Example 10

Phosphate Removal—In an embodiment, Phosphate Accumulating Organism (PAO's), which typically are less than 1% of whole biomass population, can be increased by 5%, 10% or more and be conditioned after growth in a secondary conditioning tank using short chain carbon materials such as volatile fatty acids (VFAs) to encourage polyhydroxybutyrate (PHB) production, which is known to be required under aerobic conditions for luxury phosphate uptake by PAOs. This increase in PAOs, preferably can take place in conjunction with reducing or eliminating easily biodegradable carbon requirements. In a embodiment there is the method of using youthful microbes for phosphate removal without the use of easily biodegradable carbon sources in the main treatment system without the use of an anaerobic zone or addition of further tanks to the main treatment system Example 10A Type 1 Processes—Chemical: Chemicals such as Ferric Chloride ($FeCl_3$) or Alum can be used to precipitate phosphorus (P)—this is usually applied in the primary clarifier, or to anaerobic digestate which is very high in P from breakdown of organic material or in the secondary clarifier for polishing. This, process however, is a very expensive tertiary treatment process producing a chemical sludge to be disposed. Therefore, there is provided the isolation of functional bacteria responsible for biological nutrient removal, in particular, and add these as a treatment batch to existing treatment systems to improve biological nutrient removal.

Example 10B

Type 2a Processes—Biological Nutrient Removal (BNR): Biological processes use selection processes by cycling the biomass/MLSS through anaerobic/anoxic/aerobic chambers to select the bacteria which accumulate phosphate generically referred to as Phosphate Accumulating Organisms (PAO's)—Glucose Accumulating Organisms (GAO's) compete for easily biodegradable carbon which reduces the population of PAO's. Until recently most have PAO's and GAO's have not been identified. Candidatus Accumulator, Tetrasphera Clade II and Candidatus compactibacter may also be used. By isolation of these bacteria a treatment batch can be made and introduced in to an activated sludge plant without the need for engineering changes or to increase the rate or mass of P removal. Therefore, there is provided an embodiment to isolate the functional bacteria responsible for biological nutrient removal and add these as a treatment batch to existing treatment systems to improve biological nutrient removal.

All these BNR processes require large amounts of readily biodegradable organic matter. Current technology results in all the bacteria in the biomass competing for the readily biodegradable carbon source. By isolation and growth of the individual bacteria responsible to P removal, growing them to provide a treatment batch and conditioning with a readily biodegradable carbon source in a second step after growth, the need for anoxic zones or carbon source supplements in biological treatment systems could be eliminated. These bacteria would be introduced at similar rates as described in other cases above. Therefore, there is a provided an embodiment to isolate the functional bacteria responsible for biological nutrient removal and add these as a treatment batch to existing treatment systems to improve biological nutrient removal.

Example 10C

Type 2b: Side stream reactor Biological Nutrient Removal (BNR) which conditions the "whole" biomass in a side stream reactor; this can be applied to existing continuous flow through facilities with BNR chambers. The process is expensive but overcomes most of the inherent instability. Therefore, there is provided an embodiment to isolate the functional bacteria responsible for biological nutrient removal and add these as a treatment batch to existing treatment systems to improve biological nutrient removal.

Example 10D

Type 2c: Granular activated sludge biomass which is used in sequencing batch reactors commercially called Nerada—the disadvantage is the EXPENSIVE process has to be applied to "Greenfield" sites or retrofits of existing SBRs. This process cannot be used in flow through systems or 90% of wastewater plants. Therefore, there is provided an embodiment to isolate the functional bacteria and add these as a treatment batch to improve settleability.

Example 11

Granular sludge formation. The present processes are used to seed a system and quickly build biomass. Therefore, there is provided an embodiment to isolate the functional bacteria responsible for granular sludge production and to add these as a treatment batch to existing treatment systems to improve settleability.

Example 12

One aspect of the invention is to take an aerobic digester that has to be aerated 24 hours a day 7 days a week and make it facultative with air on may be 1-2 days per week Example 13

In an embodiment the sludge is held in several tanks, and moved in parallel, serially, or combinations of these. The addition of microbes to one or more of the tanks, as the sludge is transferred between tanks, or a period of time obtains class A sludge at the final or discharge tank.

Example 14

Populations of added microbes, (in an embodiment preferably youthful microbes, in an embodiment, youthful floc formers, and in an embodiment combinations and variations of these) out compete pathogens significantly reducing the number of pathogens in the sludge. A pathogen described herein refers to disease causing microbe or micro-organism to humans, animals or fish. These microbes are commonly in sewage, hospital waste, run-off water from farms, and in water used for swimming. As such, environmental agencies require operators of sewage treatment and industrial treatment to monitor for the actual pathogen or "indicators" of such pathogens, which might be more easily measurable by the average laboratory technician without specialized equipment or expertise.

Typically, in municipal wastewater treatment the liquid final effluent before discharge has to treated by chlorination or ozonation or ultraviolet light or chemically treated or with peracetic acid to eliminate discharge of excessive amounts of coliforms found in fecal matter treated by the municipal plant or where bathing beach standards apply such standards are met traditionally by extending outfalls to achieve more dilution. This process can be very costly, and has potential to not be performed correctly resulting in potentially dangerous release to high a level of pathogens.

Embodiments of the present treatment systems and methods greatly reduces the amount of pathogens present, and thus, that must be treated before discharge. In this manner the present treatment systems and methods can reduce the amount of pathogens in the effluent, while minimizing and potentially eliminating the need for treatment by conventional chemical or optical systems. Further, the safety and efficacy of these conventional systems is greatly enhanced by the present treatment systems and methods.

Treatment with liquid microbes in the amounts, location and frequency as described in this specification depending on the type and size of secondary treatment plant or primary sludge or aerobic or anaerobic digesters would significantly reduce further growth and survival of pathogens, in particular coliforms, by competing for carbon sources thereby reducing the fecal contamination or other pathogen contamination by at least 1 log in the biosolids and by at least 0.25 logs more in the liquid effluent than is present absent such treatment. For fecal contamination the addition of the liquid microbes would result in liquid effluent concentrations of less than 150,000 or less than 75,000 or less than 50,000 or less than 25,000 or less than 10,000 or less than 5,000 or less than 1,000 or less than 500 per 100 ML, in preferred embodiments the levels are reduced to levels that meet the standard for the receiving water or bathing beach standards whether fresh water or marine discharges at the point of dilution required by the environmental agency of concern without the need for full traditional engineering solutions, which can be reduced in scale, size and cost.

Example 15

To the same end, in embodiments of the present systems and methods, pathogens in wasted solids from primary or secondary treatment, termed solids or biosolids, are greatly reduced. Typically, in operation waste water treatment plants have monitor the pathogen content in wasted solids from primary or secondary treatment, termed solids or biosolids.

In embodiments of the present systems and methods, treatment with liquid microbes in the amounts, location and frequency described in this specification depending on the type and size of secondary treatment plant or primary sludge or aerobic or anaerobic digesters would significantly reduce further growth and survival of pathogens, in particular coliforms, by competing for carbon sources thereby reducing the fecal contamination or other pathogen contamination by at least 1 log in the biosolids. For fecal contamination the addition of the liquid microbes would result in biosolids concentrations of less than 2,000,000 or less than 1,000,000 or less than 500,000 or less than 250,000 or less than 100,000 or less than 50,000 or less than 10,000 or less than 1000 per gram or good enough to meet the standard for disposal with or without further downstream treatment.

Example 16

In an embodiment an onsite fermentation system of the type disclosed and describe in U.S. Pat. Nos. 9,409,803 and 7,879,593 is located at a regional distribution site. Treatment batches are prepared at this location and then after preparation are concentrated by reducing the amount of water present in the treatment batch by about 10%, about 20%, about 30%, about 50%, from about 20% to about 80%. The concentrated treatment batches have ages (either average or D50) that are less than 2 weeks before the concentrated treatment batch is added to waste water in a treatment facility located near the regional distribution site. The concentrated treatment batch are then added at amounts and at feed rates that maintain the age of the microbes in these system at or below the MCRT, or other desirable age limits, or to kept the amount or level of pathogens in the system to a minimum.

Example 17

The systems and methods of the present embodiments provides sludges, and the treatment of soils to provide soils, having one or more and preferably all of the following characteristics and uses set out in Examples 17A to 17. These sludges are then applied directly to soils, for example surface applications or subsurface applications, for agricultural purposes; and through this application to soils provide soils having these following properties. These sludges are obtained without the need for, and without the use of, one, or more, and preferably all of the following: pasteurization, mesophilic anaerobic digestion, thermophilic aerobic digestion, composting, lime stabilization, ozone treatment, and pH based (acid or caustic) treatments; thermophilic digestion, thermal drying, disinfecting processes, procedures or apparatus, such as for example, BCR process using caustic and acidic treatment to formulate hypochlorite as a biocide.

Example 17A

A sludge having a concentration limit is at or below: Molybdenum 3, Selenium 2, Arsenic 2, Fluoride 200 (mg/kg dry solids).

Example 17B

A soil, treated with an essentially pathogen free sludge from the present systems and methods, having the vector attraction requirements of EPA or State regulations and parameters set out in Table 4.

TABLE 4

| PTE | pH 5-5.5 | pH 5.-6 | pH 6.0-7 | pH >7 |
|---|---|---|---|---|
| | Maximum concentration in soil of PTE (mg/kg dry solids) | | | |
| Zinc | 200 | 200 | 200 | 300 |
| Cooper | 80 | 100 | 135 | 200 |
| Nickel | 50 | 60 | 75 | 110 |
| | Maximum concentration in soil of PTE (mg/kg dry solids) when pH > 5 | | | |
| Cadmium | 3 | | | |
| Lead | 300 | | | |
| Mercury | 1 | | | |
| Chromium | 400 | | | |
| Molybdenum | 4 | | | |
| Selenium | 3 | | | |
| Arsenic | 50 | | | |
| Fluroide | 500 | | | |

Example 17C

A sludge having less than 1,200 mg/kg dry solids of lead; less than 1,000 mg/kg dry solids of fluoride; and preferably both.

Example 18

The systems and methods of treating with youthful microbes are used at a large metropolitan waste water treatment plant in the southern United States, serving a population of over 1.5 million residents, and having multiple waste water treatment plants having, such as one or more of the waste water treatment plants operated for Miami-Dade, Fla. USA. At present the wastewater treatment plant is a pure oxygen injection activated sludge plant referred to as Unox with no primary clarifiers and anaerobic digestion for reducing the mass excess biosolids followed by conventional mechanical dewatering facilities and disposal. The liquid microbes are grown on-site, not freeze dried or frozen or preserved in any manner at any time prior to application. These microbes are added at the incoming flow to the Unox basins so as to distribute the dosage across the entire system or injected into the return activated sludge (RAS) recycle line depending on ease of access. Additionally, further batches could be added to the digesters to enhance settleability or improve decantability and further digestion and conditioning or stabilization of the biomass to out-compete pathogens, such as *E. coli*, coliforms and *Salmonella* or other pathogens of concern which would grow or regrow under such conditions.

The Unox system is dosed at a rate of from about 5,000 gals per day (gpd) to about 175,000 gpd, from about 10,000 gpd to about 50,000 gpd, about 20,000 gpd to about 75,000 gpd, about 5,000 gpd to about 100,000 gpd, less than about 10,000 gpd, less than about 20,000 gpd, less than about 50,000 gpd, less than about 100,000 gpd, as well as larger and smaller rates, and all rates within these ranges. Preferably the additions are made daily, but batches can be added less frequently than daily, such as once every two days, once every 3 days or once per week or once per month. The anaerobic system would be dosed based on the ability to decant water off the solids in order to hold the biosolids longer and/or if there was a fall in methane production indicating a slowing down in microbial activity and digestion of the solids in order to increase methane production. The anaerobic digester(s) would be dosed with similar quantities to the Unox system, but once, twice or three times within one day or week or month. The goal of dosing these batches would be to out-compete the growth of pathogenic bacteria in both the activated sludge system and the anaerobic digester thereby causing die off and hence the ability to make the equivalent of a Class B or Clean Class B or Class A, while producing more methane; from the activated sludge system of to hold the Class B sludge long enough in the digesters or ancillary tanks to achieve Class A for disposal. The holding time required between the activated sludge system and the anaerobic digesters would be less than 30 days, less than 60 days, less than 90 days, less than 120 days or less than 150 days. Biosolids can be held longer where there is a benefit to reduce further downstream processing. If further non-mechanical methods processing of biosolids were used, such as compositing; then the residual biosolids in the composting pile would be dosed to prevent further regrowth of pathogens and/or to accelerate the composting process with mesophiles and/or thermophiles to allow faster turnaround of the composting process and hence lower costs of operation; pretreatment with batches of any wood chips, straw or other fillers used in the composting process that might carry pathogens of concern could be essential in preventing contamination and further regrowth; the compost pile, biosolids transferred and/or any fillers is dosed at a rate of from about 1 gallons per ton (gals/ton) to about 1000 gals/ton, from about 10 gals/ton to about 500 gals/ton, about 20 gals/ton to about 750 gals/ton, about 50 gals/ton to about 1000 gals/ton, less than about 1 gals/ton, less than about 20 gals/ton, less than about 50 gals/ton, less than about 1000 gals/ton, as well as larger and smaller rates, and all rates within these ranges. Preferably the additions are made daily, but batches can be added less frequently than daily, such as once every two days, once every 3 days or once per week or once per month depending on when materials are being processed hence the ability to make the equivalent of Class A biosolids material that could be directly sold or given away at no cost to the public or local farmers.

Example 19

The systems and methods of treating with youthful microbes are used at large, midsized and small metropolitan and rural waste water treatment plant in Ireland and the United Kingdom. In many places, the waste water treatment plants have lagged behind population growth, changing environment standards and both. Many such plants are at their design capacity, struggling with meeting the permit requirements for discharge and scheduled for massive redesign. These redesigns can be exceeding expensive, requiring considerable capital expenditures. The present systems and methods, when applied to one of these older plants, can greatly increase its efficacy, ability to meethydrolytcompliance, reduce operating costs, reduce and eliminate the need for costly capital upgrades, and both.

For example, in Northern Ireland there are approximately 795,000 domestic, agricultural, commercial and business properties connected to the public water supply and 660,000 connected to the public sewerage system. Northern Ireland Water (NIW) supplies 619 million liters of water every day and treats 134 million cubic meters of wastewater each year. The company operates 40 impounding reservoirs, 44 major water treatment works (65 in total), 490 service reservoirs, 287 water pumping stations and 26,500 kilometers of water mains. The company also owns and operates 1,194 wastewater pumping stations, 14,500 kilometers of sewers and 1,124 wastewater treatment works. The main Belfast plant at Duncrue currently treats a population equivalent (PE) of 300,000 and an internal source of effluent from the biosolids/sludge incinerator, which is estimated to add around another 10-25% of load to the wastewater plant. It is well known engineering practice to use 200 litre/d per head of population equivalency (PE) or 50 to 70 gals/day in USA, which is associated with 150-300 mg/L BOD or 6.2.5 to 175 lbs BOD/d/1000PE or 28.4 to 79.5 kg per 1000 PE; this can also be described per PE by dividing by 1000. The sludge incinerator processes sludge from all over Northern Ireland as the final treatment step prior to disposal of ash. The present systems and treatments can be used on one, or more, or all of these treatment facilities and plants.

Example 19A

A wastewater treatment plan is set-up with primary clarifiers, secondary biological treatment with diffused air followed by secondary clarifiers, chlorination with ocean discharge. In this example, it is assumed that the plant is at design, struggling with meeting the permit requirements for discharge and scheduled for massive redesign. An embodiment of the present inventions would be a novel method to upgrade such a facility at minimal cost and would be redesigning the flow regime and function of the primary clarifiers to make these anoxic zones and integral to the biological treatment process. The upgraded treatment design allows for greater treatment, while the plant would be to improve settleability, increase hydraulic and/or organic loading rate capacity to 325,000 PE to 500,000 PE, or 350,000 PE to 750,000 PE or PE between these ranges; or 10-20% greater PE, or 20-40% greater PE, or 10-200% greater PE or % increases between these ranges, while reducing biosolids production and associated pathogens to create the equivalent of a Class B, clean Class B or Class A biosolids. The plant could dosed at the headworks or the anoxic zones, recycled activated sludge (RAS) lines, splitter boxes or directly in to the aeration basins. The plant could be further upgraded to include aerobic or anaerobic digesters where further dosing of the microbes could occur at rates similar to other examples above in order to reduce biosolids production further and produce an equivalent Class A or better biosolids. The plant would be dosed at a rate of from about 1,000 liters per day (l/d) to about 50,000 l/d, from about 10,000 l/d to about 50,000 l/d, about 20,000 l/d to about 75,000 l/d, about 1,000 l/d to about 100,000 l/d, less than about 1000 l/d, less than about 20,000 l/d, less than about 50,000 l/d, less than about 100,000 l/d, as well as larger and smaller rates, and all rates within these ranges. Preferably the additions are made daily, but batches can be added less frequently than daily, such as once every two days, once every 3 days or once per week or once per month. Batches can also be made of multiple strength by increasing the amount of food added to the batch and/or reducing the amount of food added to the batch the above example being 1× wherein 1× represents 0.1 kg of food per 1,000 liters or 1 kg of food per 1,000 liters or 10 kg food per 1,000 liters or 100 kg food per 1,000 liters of microbes manufactured. Food for the microbes can be acquired from Advanced Biofermentation Services Inc, Fleming Island, Fla. 32006 USA.

Furthermore for operating many plants of different size the preferred practice would be to manufacture at the largest or medium sized wastewater plants doses for the smaller plants. These doses could be delivered in different strengths to reduce the volume of liquid being hauled or concentrated using well, known technology to a skilled person in the art of membrane separation systems to concentrate the volume further with concentrations in the range of 2-100× or 5-20× or 20-50× or multiples thereof incorporating batch strength and volume reduction or ranges between these. Suitable membrane separation systems can be obtained from Advanced Biofermentation Services, Fleming Island, Fla. USA. One advantage being to dose a small plant with 1-20 liters rather than 50-2000 liters means a route person with a small van or personal car could make deliveries, hence significantly reducing the cost of transportation, while allowing the doses to be added within 24, hours, 48 hours, 1-7 days or ranges between. Where distance or traffic became limiting regional facilities would be established to meet the optimum economic routes to be established based on personnel, traffic, time, costs of delivery and logistics.

Example 20

The systems and methods of treating with youthful microbes are used at large, midsized and small metropolitan and rural waste water treatment plant in the Mid-Atlantic states in the United States, where populations can be exceeding dense. For example, the District of Columbia Water and Sewer Authority operates the Washington D.C. area wastewater plant known as Blue Plains which has a NPDES Permit DC0021199, dated Sep. 1, 2017, which permit is incorporated by reference herein in its entirety. The liquid microbes, for the present treatments at this plant are grown on-site, not freeze dried or frozen or preserved in any manner at any time prior to application. These microbes are added at the incoming flow at the headworks, primary clarifiers, aeration basins or in to the nitrification/denitrification process (hereinafter wastewater system) so as to distribute the dosage across the entire system or injected into the return activated sludge (RAS) recycle line depending on ease of access. Additionally, further batches could be added to the anaerobic digesters after thermophilic hydrolysis to improve decantability and further digestion and conditioning or stabilization of the biomass to out-compete pathogens, such as *E. coli*, coliforms and *Salmonella* which would grow under such conditions or survive thermal hydrolysis processes.

The wastewater system is dosed at a rate of from about 5,000 gals per day (gpd) to about 175,000 gpd, from about 10,000 gpd to about 50,000 gpd, about 20,000 gpd to about 75,000 gpd, about 5,000 gpd to about 100,000 gpd, less than about 10,000 gpd, less than about 20,000 gpd, less than about 50,000 gpd, less than about 100,000 gpd, as well as larger and smaller rates, and all rates within these ranges. Preferably the additions are made daily, but batches can be added less frequently than daily, such as once every two days, once every 3 days or once per week or once per month. The anaerobic system would be dosed based on the ability to decant water off the solids in order to hold the biosolids longer and/or if there was a fall in methane production indicating a slowing down in microbial activity and digestion of the solids in order to increase methane production. The anaerobic digester(s) would be dosed with similar quantities to the Unox system, but once, twice or three times within one day or week or month. The goal of dosing these batches would be to out-compete the growth of pathogenic bacteria in both the activated sludge system and the anaerobic digester thereby causing die off and hence the ability to make the equivalent of a Class B or Class A, while producing more methane; from the activated sludge system of to hold the Class B sludge long enough in the digesters or ancillary tanks to achieve Class A for disposal. The holding time required between the activated sludge system and the anaerobic digesters would be less than 30 days, less than 60 days, less than 90 days, less than 120 days or less than 150 days. Biosolids can be held longer where there is a benefit to reduce further downstream processing.

Example 21

The systems and methods of treating with youthful microbes are used at large, midsized and small metropolitan and rural waste water treatment plant in the Mid-Atlantic states in the United States, where populations can be exceeding dense. For example, Massachusetts Water Authority operates Deer Island wastewater treatment plant servicing the Boston area.

Example 22

Sludge, effluent wastewater or both is produced from a waste water treatment plant using the present youthful microbial treatments, without the need for, and without post processing or treatments, that meets the following: the geometric mean of the value for effluent samples collected in a period of 30 consecutive days shall not exceed 200 per 100 ml; and the geometric mean of the value for effluent samples collected in a period of seven consecutive days shall not exceed 400 per ml.

Example 23

Sludge, effluent or both is produced from a waste water treatment plant using the present youthful microbial treatments, without the need for, and without post processing or treatments, having the properties of Table 5.

TABLE 5

| Date | Fecal count/100 ml | Geometric Mean by Month | Mean |
|---|---|---|---|
| Aug. 2, 2019 | 60 | | |
| Aug. 9, 2019 | 39 | | |
| Aug. 16, 2019 | 27 | | |
| Aug. 23, 2019 | 21 | | |
| Aug. 31, 2019 | 41 | 35.25 | 37.6 |
| Sep. 6, 2019 | 48 | | |
| Sep. 13, 2019 | 178 | | |
| Sep. 20, 2019 | 30 | | |
| Sep. 27, 2019 | 54 | 60.99 | 77.5 |
| Oct. 4, 2019 | 98 | | |
| Oct. 9, 2019 | 39 | | |
| Oct. 18, 2019 | 52 | | |
| Oct. 23, 2019 | 10 | | |
| Oct. 30, 2019 | 12 | 29.89 | 42.2 |
| Nov. 6, 2019 | 31 | | |
| Nov. 14, 2019 | 16 | | |
| Nov. 20, 2019 | 247 | | |
| Nov. 27, 2019 | 121 | 62.05 | 103.8 |
| Dec. 4, 2019 | 39 | | |
| Dec. 12, 2019 | 124 | | |
| Dec. 18, 2019 | 1 | | |
| Dec. 27, 2019 | 4 | 11.79 | 42 |
| Jan. 3, 2019 | 1 | | |
| Jan. 9, 2019 | 8 | | |
| Jan. 16, 2019 | 20 | | |
| Jan. 22, 2019 | 373 | | |
| Jan. 19, 2019 | 31 | 17.92 | 86.6 |
| Feb. 5, 2019 | 1 | | |
| Feb. 14, 2019 | 20 | | |
| Feb. 19, 2019 | 20 | | |
| Feb. 28, 2019 | 63 | 12.60 | 26 |
| Mar. 8, 2019 | 48 | | |
| Mar. 14, 2019 | 16 | | |
| Mar. 21, 2019 | 20 | | |
| Mar. 27, 2019 | 8 | 23.87 | 23 |

In another embodiment this waste is produced with minimal or reduced number of post processing steps.

Example 24

In embodiments, treatment with liquid microbes in the amounts, location and frequency described herein depending on the type and size of secondary treatment plant creates a sludge or biosolids that meets the EPA standards set forth in 40 CFR Part 503 for pathogens, vector attraction and metals, but furthermore increases the fertilizer value. An example from the City of Starke Fla. is illustrated in FIG. 14 for the metals contents showing that despite extended holding times exceeding 100 days metals of concern do not accumulate. In fact, the treatment with liquid microbes enhances the fertilizer value of the biosolids by increasing the N:P ratio from 1.0 to 2.38 and the P:K ratio from 0.21 to 1000, which for fertilizer purposes the higher potassium and N:P ratios are highly beneficial, while at the same time to the total phosphorus in the produce fell by 10% from 2.3 to 2.1 mg/Kg, which would allow 10% more biosolids to be applied to land restricted by phosphorus content.

Example 25

In an embodiment, the addition of liquid microbes or treatment with liquid microbes in the amounts, location and frequency described herein depending on the type and size of secondary treatment plant creates a liquid effluent that meets the characteristics for freshwater receiving stream discharges or marine discharges for pathogen content as indicated in Table 6 for Georgia standards below whether for total fecals, *E. coli* or *Enterococci*. Data attached for about an 8-month period from a kraft mill, representative of the pulp and paper industry, which is being treated with liquid microbes shows that the geometric mean is less than 62.05 for fecal coliforms, representing *E. coli*, which is less than the standard shown in Table 7. Georgia in the USA, is expected to adopt a statistical mean of 200 cfu/100 mL average per month with a daily maximum of 400 cfu/100 mL. "The addition of liquid microbes or treatment with liquid microbes in the amounts, location and frequency described herein depending on the type and size of secondary treatment plant creates a liquid effluent that meets the characteristics for freshwater receiving stream discharges or marine discharges for any current EPA or State regulation in the USA.

TABLE 6

Georgia Fecal Coliform Standards

| Use Classification | Bacteria Levels (Fecal coliform) | |
|---|---|---|
| | 30-Day Geometric Mean (cfu/100 ml) | Maximum (cfu/100 ml) |
| Drinking Water requiring treatment | 1,000 (Nov-April) 200 (May-Oct) | 4,000 (Nov-April) |
| Recreation | 200 (Freshwater) 100 (Coastal) | — |

TABLE 6-continued

Georgia Fecal Coliform Standards

| Use Classification | Bacteria Levels (Fecal coliform) | |
|---|---|---|
| | 30-Day Geometric Mean (cfu/100 ml) | Maximum (cfu/100 ml) |
| Fishing | 1,000 (Nov-April) 200 (May-Oct) | 4,000 (Nov-April) |
| Coastal Fishing | | |
| Scenic River | No alteration of natural water quality | |
| Wild River | No alteration of natural water quality | |

TABLE 7

Fresh and Marine Water Quality Criteria for Bacteria

| Indicator[a] | Geometric Mean (per 100 mL) | Single maximum (per 100 mL) | | | |
|---|---|---|---|---|---|
| | | Designated bathing beach (75% CL) | Moderate use coastal recreation waters (82% CL) | Light use coastal recreation waters (90% CL) | Infrequent use coastal recreation waters (95% CL) |
| Freshwater | | | | | |
| E. coli | 126[b] | 235[c] | 298[c] | 409[c] | 575[c] |
| enterococci | 33[d] | 61[c] | 78[c] | 107[c] | 151[c] |
| Marine | | | | | |
| enterococci | 33[d] | 104[e] | 158[e] | 276[e] | 501[e] | aa state may determine which indicators apply to its fresh coastal recreation waters; until a state makes that determination, *E. coli* will be the applicable indicator
[b]value for use with analytical methods 1103.1, 1603, 1604, or equivalent method that measures viable bacteria
[c]calculated using single maximum = geometric mean * 10^ (confidence level factor * log standard deviation), where the confidence level factor is 75%:0.68; 82%:0.94; 90%:1.28; 95%:1.65; log standard deviation from EPA's epidemiological studies is 0.4
[d]value for use with analytical methods 1106.1, 1600, or equivalent method that measures viable bacteria
[e]calculated using single maximum = geometric mean * 10^ (confidence level factor * log standard deviation), where the confidence level factor is 75%:0.68; 82%:0.94; 90%:1.28; 95%:1.65; log standard deviation from EPA's epidemiological studies is 0.7
CL = confidence level Example 26

An embodiment of a multi-tank system is provided.

After the secondary treatment process waste solids or biosolids, herein the same, are removed for further processing into holding tanks, aerobic, anaerobic or facultative digesters, which are used to reduce the mass of biosolids further, then the remains concentrated using dewatering equipment such as belt presses or centrifuges with options to process the biosolids through thermophilic, drying or chemical processes to destroy pathogens prior to final disposal to landfill or land application for farming or incineration or where drying in a pelletizer is used the end product can be sold for commercially as a fertilizer, such as Milorganite. Treatment of aerobic or anaerobic or facultative with liquid microbes in the amounts, location and frequency described herein depending on the type and size are made to further out-compete pathogens of concern and prevent regrowth of such pathogens in order to generate biosolids which are Class A or Class B or Class Clean B as per EPA Federal guidelines or State Regulations. Such aerobic, anaerobic or facultative digester or tanks can be used or changed from the original design to work in other modes, such as an aerobic digester working facultative or anaerobically or both or an anaerobic digester or tank being altered to work aerobically or facultative or both by sequencing the system with air on and off for less than 1 day per week or less than 2 days per week or less than 3 days per week of less than 4 days per week or less than 5 days per week or less than 3 hours per day or less than 6 hours per day or less than 12 hours per day or less than 18 hours per day. Where there is only one holding tank or aerobic or anaerobic or facultative digester, then further tanks can be added so that as sludge or biosolids is wasted the tank does not become contaminated further with pathogens. The preferred method would be to have a series of 2 tanks or 3 tanks or 4 tanks for meeting Class A biosolids to provide holding times described herein in which the sludge or biosolids could be held and transferred sequentially as new sludge or biosolids is wasted from the secondary treatment system. Any of these digesters can be operated in any mode from aerobic to facultative to anaerobic or switched around depending on the preferred orientation of the specific system. These tanks can be orientated to go through nitrification and denitrification cycles so that the ammonia released from the breakdown of organics (measured as TKN) can be released by denitrification to nitrogen gas thereby reducing oxygen demand on the secondary treatment system which would normally have to treat more ammonia. This is particularly true for anaerobic systems as there is no nitrification which only occurs under aerobic conditions. The use of multiple tanks in multiple modes seeks to reduce ammonia loads back to the main secondary treatment system. Furthermore, once the digested liquor ammonia is converted to nitrate, this could be used an additional source of oxygen for the secondary treatment system, which would be used in anoxic or anaerobic zones ahead of aeration thereby reducing energy for electricity for aeration in the secondary treatment system. The phosphorus released in to liquid phase from the breakdown of biosolids could be removed chemically or taken from the first, second or third aerobic or facultative digester or holding tank and concentrated using dewatering equipment described herein or after removal of nitrate in an anoxic or anaerobic digester or holding tank processed in a separate biological sidestream reactor dedicated to phosphorus removal using PAO microbes seeded by adding liquid microbes in the amounts and frequency described herein. By use of such a side stream reactor coupled with membrane separation technology to hold the PAO's, the concentration of phosphorus in the sludge or biosolids in this rector could be raised to greater than 1% or greater than 2% or greater than 5% or greater than 10% or greater than 15% or greater than 20% or greater than 30% as P by weight. This biosolids or sludge could then be harvested and used as a high strength, slow release phosphate fertilizer.

Example 27

An embodiment of a treatment system and method for liquid effluent from a pulp and paper mill is provided.

The pulp and paper industry is the largest industrial user of water ranging from 1-60 MGD. Recent concerns have been raised over pathogen releases in the effluent discharged in to receiving streams. In studies done by the industry and presented by the National Council for Air and Stream Improvement copies of which are available from Members such as Advanced Biofermentation Services Inc., Fleming Island, Fla. 32003 USA and are hereto incorporated by reference show coliform numbers can range from 180-160,000 per 100 mL. The water criteria set by US EPA are suggested in the NCASI Bulletin Table 7 herein and can be modified to be tighter by individual states. By addition of liquid microbes to the secondary treatment systems such as single pass lagoons, aerated stabilization systems or activated sludge plants commonly used by the Pulp and Paper industry limits for pathogens of concern could be met without further treatment saving the mills excessive amounts of capital and high operating costs in order to meet these new standards due to the high water consumption and discharge. Treatment with liquid microbes in the amounts, location and frequency described herein depending on the type and size of secondary treatment plant are made to meet the regulatory standards and example of which is provided in Table 7.

It is noted that there is no requirement to provide or address the theory underlying the novel and groundbreaking processes, materials, performance or other beneficial features and properties that are the subject of, or associated with, embodiments of the present inventions. Nevertheless, various theories are provided in this specification to further advance the art in this area. The theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the function-features of embodiments of the methods, articles, materials, devices and system of the present inventions; and such later developed theories shall not limit the scope of protection afforded the present inventions.

The various embodiments of systems, equipment, techniques, methods, activities and operations set forth in this specification may be used for various other activities and in other fields in addition to those set forth herein. Additionally, these embodiments, for example, may be used with: other equipment or activities that may be developed in the future; and, with existing equipment or activities which may be modified, in-part, based on the teachings of this specification. Further, the various embodiments set forth in this specification, including dosing amounts and rates, microbe ages, microbe addition points, may be used with each other, in any one or more of the examples, in any one or more of the embodiments and in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed:

1. A method of controlling the age of a microbial population in treating an influent wastewater stream, the method comprising:

a. in a wastewater treatment system having an influent of wastewater containing pollutants, the wastewater treatment system comprising a first treatment device, a second treatment device and a third treatment device; wherein the wastewater flows from the first treatment device to the second treatment device to the third treatment device;

b. adding a plurality of microbes to the wastewater treatment system at a controlled and predetermined dosing rate; the microbes selected to remove the pollutants from the wastewater; wherein the plurality of microbes added is at a concentration of from about $10^3$ cfu/ml to about $10^{13}$ cfu/ml; the microbes never being frozen or freeze dried, and having a D50 age of less than 14 days old;

c. wherein the dosing rate maintains the D50 age of the microbes in the wastewater in the wastewater treatment system at less than 20 days old; and, d. whereby the pollutants in the wastewater are reduced providing an effluent having pollutants as measured by BOD and TSS reduced by at least about 90%.

2. The method of claim 1, wherein the wastewater treatment system has a throughput of about 5 MGD to about 40 MGD.

3. The method of claim 1, wherein the wastewater treatment system has a throughput of about 20 MGD to about 100 MGD.

4. The method of claim 1, wherein the wastewater treatment system has a throughput of greater than 10 MGD.

5. The method of claim 1, wherein the wastewater treatment system has a throughput of greater than 100 MGD.

6. The method of claim 1, 2, 3, 4 or 5, wherein the microbes are added to the second treatment device.

7. The method of claim 1, 2, 3, 4 or 5, wherein the microbes are added to the third treatment device.

8. The method of claim 1, 2, 3, 4 or 5, wherein the microbes are added to at least two of the treatment devices at a dose rate for each such treatment device; whereby the dosing rate to the wastewater treatment system is cumulative of the dose rates for each such treatment device.

9. The method of claim 1, wherein the wastewater treatment system has a throughput of about 200 MGD to about 300 MGD and comprises a fourth treatment device;
   a. wherein the first treatment device comprises screens and a girt chamber, whereby large particles, plastic and girt are removed from the wastewater;
   b. wherein the second treatment device comprises a basin;
   c. wherein the third treatment device comprises a settling tank; wherein a return stream comprising an activated sludge is flowed to the second treatment device; wherein the effluent is flowed from the third treatment device;
   d. wherein the fourth treatment device comprises a holding tank; wherein sludge from the third treatment device is flowed to the fourth treatment device; wherein the sludge is thickened in the fourth treatment device.

10. The method of claim 9, wherein the microbes are added to the second treatment device.

11. The method of claim 9, wherein the microbes are added to the third treatment device.

12. The method of claim 9, wherein the microbes are added to the second and third treatment devices; whereby the dose rate is cumulative of a dose rate for each treatment device.

13. The method of claim 9, wherein the sludge has a fecal coliform level of less than 1,000 most probable number (MPN) per gram of total solids (dry weight), and a *Salmonella* sp. bacteria level of less than 3 MPN per 4 grams total solids (dry weight).

14. The method of claim 9, wherein a dose of microbes is added to the fourth treatment device.

15. The method of claim 9, wherein the second treatment device does not have oxygen added to it.

16. A method of producing class A sludge without the need for disinfectant processing, the method comprising:
   a. obtaining sludge from an activated sludge wastewater treatment plant;
   b. flowing the sludge into a settling tank;
   c. adding microbes to the settling tank, wherein the microbes are selected to degrade pollutants in the sludge; wherein the microbes have not been frozen or freeze dried; whereby the microbes degrade the pollutants in the sludge;
   d. holding the sludge in the settling tank for a holding period;
   wherein the holding period is at least 60 days;
   e. removing the sludge from the holding tank after the holding period; wherein the removed sludge is a Class A sludge;
   whereby during the holding period the sludge is not subjected to a disinfectant process.

17. A method of controlling the age of microbial in treating an influent wastewater stream, the method comprising:
   a. in a wastewater treatment system having an influent of wastewater containing pollutants, the wastewater treatment system comprising a first treatment device, a second treatment device and a third treatment device; wherein the wastewater flows from the first treatment device to the second treatment device to the third treatment device;
   b. adding a plurality of microbes to the wastewater treatment system at a controlled and predetermined dosing rate; the microbes selected to remove the pollutants from the wastewater; wherein the plurality of microbes added is at a concentration of from about $10^3$ cfu/ml to about $10^{13}$ cfu/ml; the microbes never being frozen or freeze dried, and having a D50 age of less than 2 days;
   c. wherein the dosing rate maintains the D50 age of the microbes in the wastewater in the wastewater treatment system at less than 4 days old; and,
   d. whereby the pollutants in the wastewater are reduced providing an effluent having pollutants as measured by BOD and TSS reduced by at least about 90%.

18. A method of controlling the age of microbial in treating an influent wastewater stream, the method comprising:
   a. in a wastewater treatment system having an influent of wastewater containing pollutants, the wastewater treatment system comprising a first treatment device, a second treatment device and a third treatment device; wherein the wastewater flows from the first treatment device to the second treatment device to the third treatment device;
   b. adding a plurality of microbes to the wastewater treatment system at a controlled and predetermined dosing rate; the microbes selected to remove the pollutants from the wastewater; the plurality of microbes containing from about $10^3$ cfu/ml to about $10^{40}$ cfu/ml; the microbes never being frozen or freeze dried, and having an average age of less than 10 days;
   c. wherein the dosing rate maintains the average age of the microbes in the wastewater in the wastewater treatment system at less than 20 days old; and,
   d. whereby the pollutants in the wastewater are reduced providing an effluent having pollutants as measured by BOD and TSS reduced by at least about 90%.

19. A method of producing a pathogen free sludge directly from wastewater, without a disinfectant post processing, the method comprising:
   a. depositing youthful microbes into an activated sludge; wherein the age is less than 3 weeks old;
   b. maintaining the age of the deposited microbes in the activated sludge below a predetermined age;

c. removing solids from the activated sludge, wherein the removed solids comprise at least a portion of the deposited microbes;

d. adding additional youthful microbes to the removed solids and holding the removed solids for a period of 30 to 160 days, whereby a clean sludge is obtaining having less than 0.1 NPM/ml of *Salmonella*.

20. The method of claim 19, wherein the clean sludge has less than 2 MPN/mL of fecal coliforms.

21. The method of claim 19 or 20, wherein the clean sludge has less than 2 MPN/4 dry grams infectious units of culturable cytopathic enteric viruses.

22. The method of claim 19 or 20, wherein the clean sludge is heavy metal free.

23. The method of claim 19, wherein the youthful microbes are less than 2 weeks old.

24. The method of claim 23, wherein the clean sludge has less than 2 MPN/mL of fecal coliforms.

25. The method of claim 23 or 24, wherein the clean sludge has less than 2 MPN/4 dry grams infectious units of culturable cytopathic enteric viruses.

26. The method of claim 23 or 24, wherein the clean sludge is heavy metal free.

27. The method of claim 19, wherein the youthful microbes are less than 5 days old.

28. The method of claim 27, wherein the clean sludge has less than 2 MPN/mL of fecal coliforms.

29. The method of claim 27 or 28, wherein the clean sludge has less than 2 MPN/4 dry grams infectious units of culturable cytopathic enteric viruses.

30. The method of claim 27 or 28, wherein the clean sludge is heavy metal free.

\* \* \* \* \*